US012359484B2

(12) United States Patent
Stuart

(10) Patent No.: US 12,359,484 B2
(45) **Date of Patent: *Jul. 15, 2025**

(54) HINGE

(71) Applicant: Polaris IP Pty Ltd, Huntleys Point (AU)

(72) Inventor: Michael Christopher Stuart, Sydney (AU)

(73) Assignee: Polaris IP Pty Ltd, Huntleys Point (AU)

(*) Notice: Subject to any disclaimer, the term of this patent is extended or adjusted under 35 U.S.C. 154(b) by 44 days.

This patent is subject to a terminal disclaimer.

(21) Appl. No.: 18/315,693

(22) Filed: May 11, 2023

(65) Prior Publication Data

US 2023/0279708 A1 Sep. 7, 2023

Related U.S. Application Data

(63) Continuation of application No. 17/518,715, filed on Nov. 4, 2021, now Pat. No. 11,680,433, which is a (Continued)

(30) Foreign Application Priority Data

Feb. 17, 2016 (AU) ................................ 2016900547

(51) Int. Cl.
*E05F 3/20* (2006.01)
*E05D 5/02* (2006.01)
(Continued)

(52) U.S. Cl.
CPC .......... *E05F 1/1215* (2013.01); *E05D 5/0246* (2013.01); *E05F 3/20* (2013.01);
(Continued)

(58) Field of Classification Search
CPC ... E05D 5/0246; E05D 5/0253; E05D 5/0261; E05D 5/0269; E05D 2003/027;
(Continued)

(56) References Cited

U.S. PATENT DOCUMENTS 1,700,086 A 1/1929 Riley
2,072,094 A 3/1937 Bommer
(Continued)

FOREIGN PATENT DOCUMENTS

AU 2011101327 A4 11/2011
CA 2466839 A1 11/2005
(Continued)

OTHER PUBLICATIONS

Notice on the First Office Action cited in CN201710243749.2 dated Jan. 19, 2018, 7 pages (English translation).
(Continued)

*Primary Examiner* — Chuck Y Mah
(74) *Attorney, Agent, or Firm* — Rothwell, Figg, Ernst & Manbeck, P.C.

(57) ABSTRACT

A hinge including: a first leaf assembly accommodating a portion of a first panel having a first cut-out section, the first leaf assembly including a first insert component which is tight fittingly receivable within the first cut-out section; a second leaf assembly, hingedly coupled to the first leaf assembly, for accommodating a portion of a second panel having a second cut-out section; a spring operatively coupled to the first and second leaf assemblies to bias the hinge to move from an open position to a closed position; and a dampener to dampen movement of the hinge from the open position to the closed position, wherein said longitudinal dampener axis is disposed between and substantially parallel with planes defined by respective opposing faces of the first panel.

12 Claims, 28 Drawing Sheets

Related U.S. Application Data continuation of application No. 16/837,416, filed on Apr. 1, 2020, now Pat. No. 11,180,941, which is a continuation of application No. 15/998,642, filed as application No. PCT/AU2017/050133 on Feb. 16, 2017, now Pat. No. 10,641,025.

(51) Int. Cl.
*E05F 1/12* (2006.01)
*E05D 3/02* (2006.01)

(52) U.S. Cl.
CPC .................. *E05D 2003/027* (2013.01); *E05D 2005/0253* (2013.01); *E05D 2005/0269* (2013.01); *E05Y 2201/21* (2013.01); *E05Y 2201/264* (2013.01); *E05Y 2201/41* (2013.01); *E05Y 2201/46* (2013.01); *E05Y 2201/499* (2024.05)

(58) Field of Classification Search
CPC .... E05D 2005/0253; E05D 2005/0269; E05D 2005/0263; E05D 2005/0261; E05D 2201/21; E05D 2201/264; E05D 2201/41; E05D 2201/46; E05D 2201/492; E05D 7/081; E05D 7/08; E05Y 2900/114; E05Y 2600/502; E05Y 2600/60; E05F 1/1215; E05F 1/12; E05F 1/1207; E05F 3/20; E05F 3/18; E05F 11/385; E06B 3/54; A47K 3/362; A47K 2003/367; A47F 3/12; A47F 3/125; Y10T 16/534; Y10T 16/5383; Y10T 16/53828; Y10T 16/53845
See application file for complete search history.

(56) References Cited

U.S. PATENT DOCUMENTS 3,499,183 A 3/1970 Parsons
4,823,438 A * 4/1989 Roloff .................. E05F 1/1215 16/390
5,079,798 A 1/1992 Burke
5,463,795 A 11/1995 Carlson et al.
5,572,768 A 11/1996 Daul
5,867,869 A 2/1999 Garrett
6,070,294 A * 6/2000 Perkins ............... E05D 11/0054 16/334
6,161,225 A 12/2000 Arai
6,766,561 B1 7/2004 Cheng
7,552,509 B2 6/2009 Chen
D616,282 S 5/2010 Cosby et al.
7,971,319 B2 7/2011 Becker
8,720,005 B2 * 5/2014 Cheng .................. E05D 5/0246 16/54
8,745,822 B2 6/2014 Garrett
8,863,356 B2 10/2014 Bacchetti
9,140,043 B2 * 9/2015 Chang ................. E05D 11/1064
10,041,685 B2 8/2018 Kim et al.
10,337,229 B2 7/2019 Beattie
10,641,025 B2 5/2020 Stuart
11,180,941 B2 11/2021 Stuart
2002/0116787 A1 8/2002 Miller
2003/0051313 A1 3/2003 Wu
2005/0125949 A1 6/2005 Lin
2006/0207060 A1 9/2006 Cheng
2009/0106937 A1 4/2009 Bai
2010/0199459 A1 * 8/2010 Bacchetti .............. E05D 5/0246 16/54
2010/0275409 A1 * 11/2010 Walhorn ............. E05D 11/1064 16/382
2011/0030168 A1 2/2011 Schau
2011/0283478 A1 11/2011 Berry
2012/0005861 A1 1/2012 Homner
2012/0216370 A1 8/2012 Chow
2012/0279015 A1 11/2012 Hung
2014/0068893 A1 * 3/2014 Hung ........................ E05F 3/20 16/52
2016/0076292 A1 3/2016 Stuart
2017/0335613 A1 11/2017 Stuart
2020/0224475 A1 7/2020 Stuart

FOREIGN PATENT DOCUMENTS

| | | | |
|---|---|---|---|
| CN | 201649942 | U | 11/2010 |
| CN | 202596383 | U | 12/2012 |
| CN | 203755860 | U | 8/2014 |
| FR | 2790812 | B1 | 9/2000 |
| FR | 2907488 | A1 | 4/2008 |
| GB | 2484527 | A | 4/2012 |
| KR | 20000057016 | A | 9/2000 |
| KR | 20030022625 | A | 3/2003 |
| WO | 2009/018615 | A1 | 2/2009 |
| WO | 2011/035499 | A1 | 3/2011 |
| WO | 2014/169332 | A1 | 10/2014 |
| WO | 2014/169333 | A1 | 10/2014 |
| WO | 2016124919 | A1 | 8/2016 |

OTHER PUBLICATIONS

Examination Report No. 1 cited in AU2018101670 dated Jan. 21, 2019, 3 pages.
Supplemental European Search Report cited in EP 17752569.8 dated Oct. 11, 2019, 8 pages.
Examination Report No. 1 cited in AU 2017201858 dated Nov. 18, 2019, 3 pages.
International Search Report cited in PCT/AU2017/050133 dated Mar. 27, 2017, 4 pages.
Australian Standard, Swimming pool safety, AS 1926.1-2012, Nov. 6, 2012, 50 pages.
Statement of Grounds and Particulars in Opposition to Australian Patent Application No. 2017201858 in the name of Polaris IP Pty Ltd and in the Matter of Opposition thereto by TCT Group Pty Limited, dated Jun. 3, 2021, 18 pages.
Position statement on Lack of novelty (filed pursuant to the orders of Burley J Made on Feb. 16, 2021), No. NSD 1013 of 2020, in opposition to Australian patent Nos. 2020100485 and 202010918, dated Apr. 6, 2021, 10 pages.

* cited by examiner

HINGE

CROSS-REFERENCE TO RELATED APPLICATIONS

This application is a continuation of U.S. patent application Ser. No. 17/518,715 filed Nov. 4, 2021, which is a continuation of U.S. patent application Ser. No. 16/837,416, filed on Apr. 1, 2020, now U.S. Pat. No. 11,180,941, issued on Nov. 23, 2021, which is a continuation of U.S. patent application Ser. No. 15/998,642, filed on Aug. 16, 2018, now U.S. Pat. No. 10,641,025, issued on May 5, 2020, which is a 35 U.S.C. 371 National Phase Entry Application from PCT/AU2017/050133, filed Feb. 16, 2017, which claims the benefit of Australian Patent Application No. 2016900547 filed on Feb. 17, 2016, the disclosures of which are incorporated herein by reference in their entireties.

FIELD OF INVENTION

The present invention relates to a hinge.

BACKGROUND

WO 2009/018615 describes a hinge including a mechanical biasing element (e.g. a spring) and a plurality of magnetic elements which bias and retain hinge members in a retained (e.g. closed) position. The magnetic elements of the hinge were configured to have an overlapping arrangement in the closed position. In particular, a first hinge member included a first magnetic element housed within the front hinge plate of the first hinge member which was located in front of the panel. The front hinge plate accommodating the first magnetic element overlapped at least a portion a tongue component of the second hinge member, wherein the tongue component housed a second magnetic element.

As the hinge was primarily designed for gates and showers which have a relatively significant weight, the first and second magnetic elements were required to provide a sufficient magnetic strength to bias the hinge toward the closed position, particularly when the spring may have suffered from mechanical wear and was unable to provide sufficient force to bias the hinge to the closed position.

Furthermore, dampeners were introduced into the hinge to control the closing action of the hinge. The dampeners were orientated orthogonally relative to the plane of the hinge members. The overlapping portion of the hinge would contact a protruding portion of the dampener when the hinge had nearly progressed to the closed position and would slowly retract until the hinge progressed to the closed position. However, despite the introduction of dampeners, structures such as glass panels of gates and shower doors could undergo significant vibration once the hinge progressed to the closed position. In particular, the structure would vibrate in a direction orthogonal to the plane of the glass panel of the structure. Over time, the vibration could lead to mechanical wear of the structure.

Furthermore, due to the dampeners being orientated orthogonally, the overall thickness of the hinge was relatively large to accommodate the dampeners which led to high manufacturing costs.

Furthermore, the requirement for magnets of sufficient strength led to the magnetic elements requiring a relatively large amount of space to be located within the hinge. The front hinge plate was designed to be relatively thick to accommodate the first magnetic element which had to have a sufficient size to bias the hinge toward the closed position.

Furthermore, due to the first magnetic element being located adjacent an outer face of the panel, the thickness of the first hinge member was accentuated. The front hinge plate of the second hinge member was also designed to have the same thickness as the front hinge plate of the first hinge member in order to be flush in the closed position. The tongue component of the second hinge member needed to bear a considerable amount of the weight of the hinged panel which therefore required a substantial amount of material to accommodate for such forces. However, as the tongue component also needed to include a relatively deep cavity to accommodate the second magnetic element having a sufficient size to bias the hinge toward the closed position, the tongue component was relatively thick.

Whilst the hinge worked well to overcome problems associated with mechanical wear experienced by torsional springs in self closing hinges, new problems arose in relation to the panels of the hinged structure undergoing vibration after closing and the physical spatial constraints dictated by the size of the overlapping magnetic elements resulting in high manufacturing costs due to the amount of steel that was required to construct the hinge.

Therefore, there is a need to overcome or alleviate one or more of the above-mentioned problems or provide a commercial alternative.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY

In a first aspect there is provided a hinge including:

- a first leaf assembly including a first front leaf component coupled to a first rear leaf component for accommodating therebetween a portion of a first panel having a first cut-out section, wherein the first leaf assembly further includes a first insert component, wherein the first insert component is tight fittingly receivable within the first cut-out section;
- a second leaf assembly, hingedly coupled to the first leaf assembly, including a second front leaf component coupled to a second rear leaf component for accommodating therebetween a portion of a second panel having a second cut-out section;
- one or more biasing components to bias the hinge toward a closed position; and
- a dampener to slow movement of the first and second leaf assemblies to the closed position, wherein at least a first portion of the dampener is located within the first insert component and a second portion is configured to at least partially retract within the first insert component when coming into contact with the second leaf assembly during hinged movement toward the closed position under bias from the one or more biasing components, wherein the second portion of the dampener extends and retracts along an axis which is coplanar with the first panel.

In certain embodiments, the first insert component houses a first magnetic element and the second leaf assembly further includes a second insert component housing a second magnetic element, wherein the second insert component is tight fittingly receivable within the second cut out section such that the second magnetic element is located between opposing faces of the second panel, wherein the magnetic attractive force between the first and second magnetic elements contribute to biasing the hinge to hingedly move toward the closed position.

In certain embodiments, the first and second magnetic elements are substantially collinear in the closed position and orthogonal to a hinge axis.

In certain embodiments, the first magnetic element has a thickness which substantially corresponds to a depth of the first cut-out section such that opposing faces of the first magnetic element are substantially coplanar with the opposing faces of the first panel, and the second magnetic element has a thickness which substantially corresponds to a depth of the second cut-out section such that opposing faces of the second magnetic element are substantially coplanar with the opposing faces of the second panel.

In certain embodiments, the first insert component and the second insert component include a first cavity and a second cavity for receiving therein the first and second magnetic elements respectively, wherein the hinge further includes a first spacer component and a second spacer component which substantially covers an opening of the first cavity and the second cavity and spaces the first and second insert components from the first and second front leaf components.

In certain embodiments, the first portion of the dampener is a dampener pin which is coupled within a hollow of the first insert component, and the second portion of the dampener is a dampener body which at least partially extends from and at least partially retracts within the hollow of the first insert component.

In certain embodiments, the second insert component includes a chamfered striking surface for an end of the dampener body to strike when moving toward the closed position.

In certain embodiments, the first insert component and the second insert component have a mouse ear shaped profile.

In certain embodiments:

the first insert component includes a first and second hole for receiving therethrough a first and second threaded stem of the first front leaf component, wherein a first and second fastener are received through corresponding holes of the first rear leaf component and fasten with the first and second threaded stems respectively to secure the first insert component between the first front leaf component and the first rear leaf component; and the second insert component includes a third and fourth hole for receiving therethrough a third and fourth threaded stem of the second front leaf component, wherein a third and fourth fastener are received through corresponding holes of the first rear leaf component and fasten with the first and second threaded stems respectively to secure the first insert component between the second front leaf component and the second rear leaf component.

In certain embodiments, the first front leaf component includes an intermediary knuckle and the second front leaf component includes a first knuckle and a second knuckle, wherein the intermediary knuckle, the first knuckle and the second knuckle are coaxial to form a barrel.

In certain embodiments, the barrel further includes a first cap including a first cap neck which extends through the first knuckle and protrudes within the intermediate knuckle, and wherein the barrel further includes a second cap including a second cap neck which extends through the second knuckle and protrudes within the intermediate knuckle.

In certain embodiments, the hinge further includes a torsion spring having a first end coupled to one of the first and second caps, wherein a second end of the torsion spring is coupled to the intermediary knuckle, wherein hinged movement of the hinge away from the closed position causes potential energy to increase in the torsion spring to thereby contribute toward biasing the hinge toward the closed position.

In certain embodiments, the hinge further includes a spring loaded component mounted to the first insert component, wherein the spring loaded component includes a ball which rolls along an inner surface of the first or second cap neck during hinged movement, wherein the inner surface includes an indentation to partially accommodate the ball when the hinge moves to an open position, wherein the ball is biased by the spring loaded component to remain at least partially within the indentation to releasably hold the hinge in the open position until an external rotational force is applied to dislodge the ball from the indentation.

In a second aspect there is provided a hinge including:

a leaf assembly including a front leaf component coupled to a rear leaf component for accommodating therebetween a portion of a panel having a cut-out section, wherein the hinge member further includes an insert component, wherein the insert component is tight fittingly receivable within the cut-out section;

a mounting assembly hingedly coupled to the leaf assembly; and a dampener to slow movement of the hinge toward a closed position, wherein the dampener includes a first portion located within the insert component and a second portion which at least partially retracts within the insert component when coming into contact with the mounting assembly during movement toward the closed position, wherein the second portion of the dampener extends and retracts along an axis which is coplanar with the panel.

In certain embodiments, the first insert component houses a first magnetic element and the mounting assembly houses a second magnetic element, wherein the magnetic attractive force between the first and second magnetic elements contribute to biasing the hinge to hingedly move toward the closed position.

In certain embodiments, the first magnetic element has a thickness which substantially corresponds to a thickness of the panel such that opposing faces of the first magnetic element are substantially coplanar with the opposing faces of the first panel.

In certain embodiments, the insert component includes a cavity for receiving therein the first magnetic element, wherein the hinge further includes a spacer component which substantially covers an opening of the cavity and spaces the insert component from the front leaf component.

In certain embodiments, the first portion of the dampener is a dampener pin which is coupled within a hollow of the insert component, and the second portion of the dampener is a dampener body which at least partially extends from and at least partially retracts within the hollow of the insert component.

In certain embodiments, the insert component includes a first and second corner hole for receiving therethrough a first and second threaded stem of the front leaf component, wherein a first and second fastener are received through holes of the rear leaf component and fasten with the first and second stems respectively to secure the insert component between the front and rear leaf components.

In certain embodiments, the front leaf component includes a intermediary knuckle and the mounting assembly includes a first knuckle and a second knuckle, wherein the intermediary knuckle, the first end knuckle and the second knuckle are coaxial to form a barrel.

In certain embodiments, the barrel further includes a first cap including a first cap neck which extends through the first knuckle and protrudes within the intermediate knuckle, and wherein the barrel further includes a second cap including a second cap neck which extends through the second knuckle and protrudes within the intermediate knuckle.

In certain embodiments, the hinge further includes a torsion spring having a first end coupled to one of the first and second caps, wherein a second end of the torsion spring is coupled to the intermediary knuckle, wherein hinged movement of the hinge away from the closed position causes potential energy to increase in the torsion spring to thereby contribute toward biasing the hinge toward the closed position.

In certain embodiments, the hinge further includes a spring loaded component mounted to the insert component, wherein the spring loaded component includes a ball which rolls along an inner surface of the first or second cap neck during hinged movement, wherein the inner surface includes an indentation to partially accommodate the ball when the hinge moves to an open position, wherein the ball is biased by the spring loaded component to remain at least partially within the indentation to releasably hold the hinge in the open position until an external rotational force is applied to dislodge the ball from the indentation such that the hinge is biased toward the closed position.

In certain embodiments, the mounting assembly includes an intermediary housing portion, wherein the intermediary housing portion includes a cavity for receiving therein the second magnetic element.

In certain embodiments, the mounting assembly includes a mounting insert component including a cavity for housing the second magnetic element, wherein the mounting insert component is tight fittingly received within the cavity of the intermediary housing portion.

In certain embodiments, the hinge further includes a mounting surface component which is releasably secured to the intermediary housing portion to enclose the cavity of the intermediary housing portion and provide a mounting surface.

In certain embodiments, the mounting surface of the mounting surface component is one of:

planar for mounting the hinge to a planar surface; and
curved for mounting the hinge to a curved surface.

In certain embodiments, the hinge further includes a cover which is fastened to the rear leaf component to restrict access to an outer surface of the rear leaf component to prevent unauthorised dismantling of the hinge, wherein the cover is able to be releasably unfastened from the rear leaf component when the hinge is moved away from the closed position. Other aspects and embodiments will be appreciated throughout the detailed description of the preferred embodiments.

BRIEF DESCRIPTION OF THE FIGURES

Example embodiments should become apparent from the following description, which is given by way of example only, of at least one preferred but non-limiting embodiment, described in connection with the accompanying figures.

DETAILED DESCRIPTION OF THE EMBODIMENTS

Figure 1A:
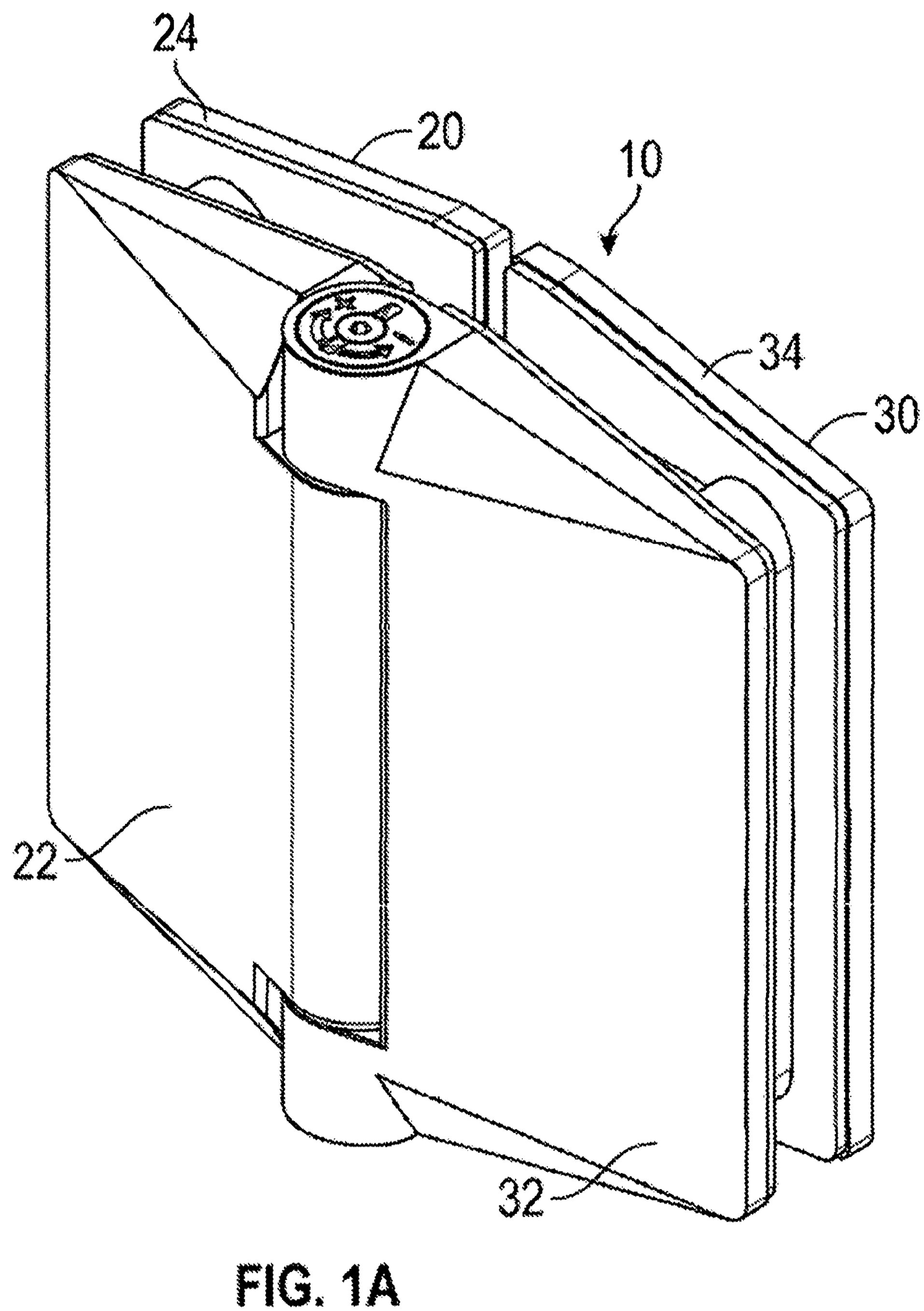
FIG. 1A is an isometric view of an example of a hinge.

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

Figure 1B:
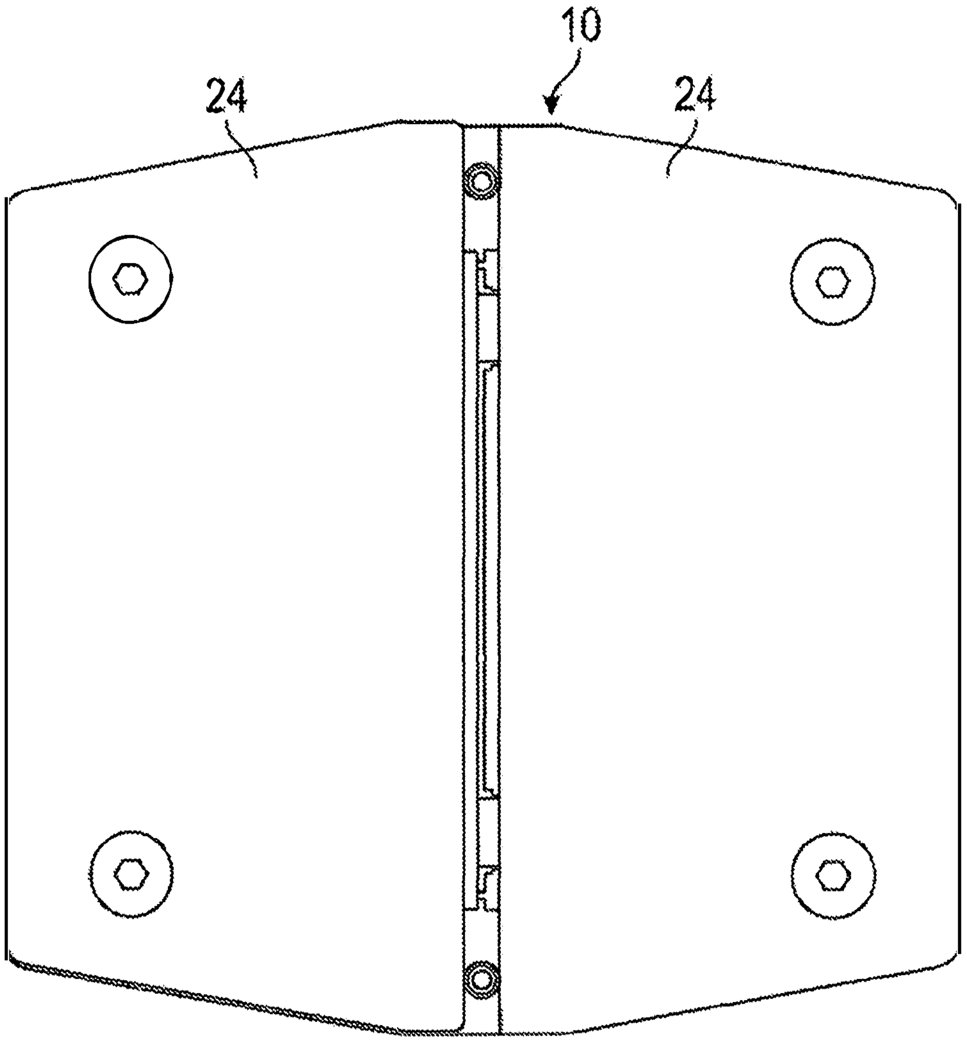
FIG. 1B is a rear view of the an example of the hinge of FIG. 1A.

Referring to FIGS. 1A and 1B, there is shown an example of a hinge 10. The hinge 10 includes a first leaf assembly 20 hingedly coupled to a second leaf assembly 30, one or more biasing components 190 to bias the hinge 10 toward a closed position, and one or more dampeners 100 to slow movement of the first and second leaf assemblies 20, 30 to the closed position.

Figure 2A:
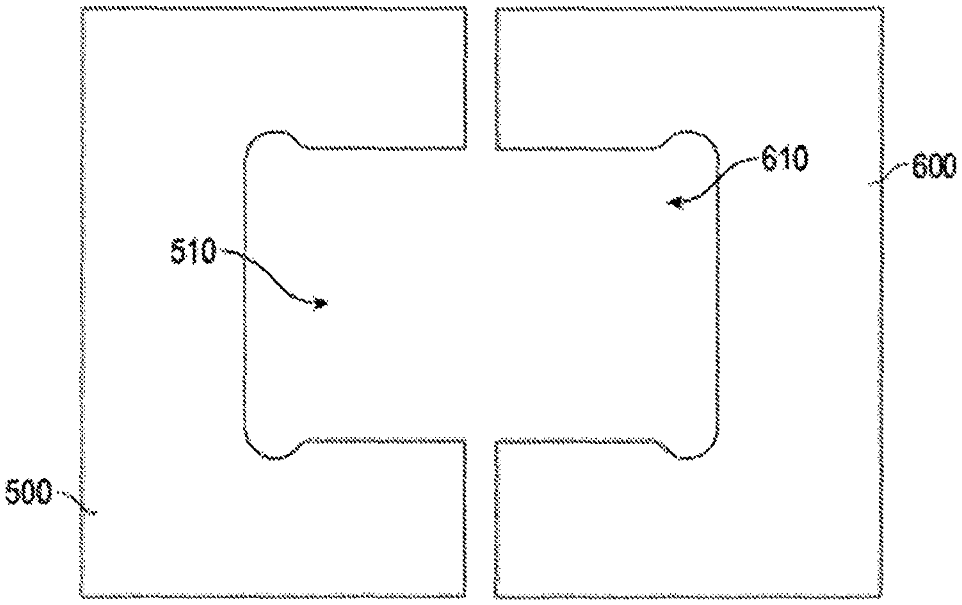
FIG. 2A is a first example of a mouse ear cut-out for a first and second panel.
Figure 2B:
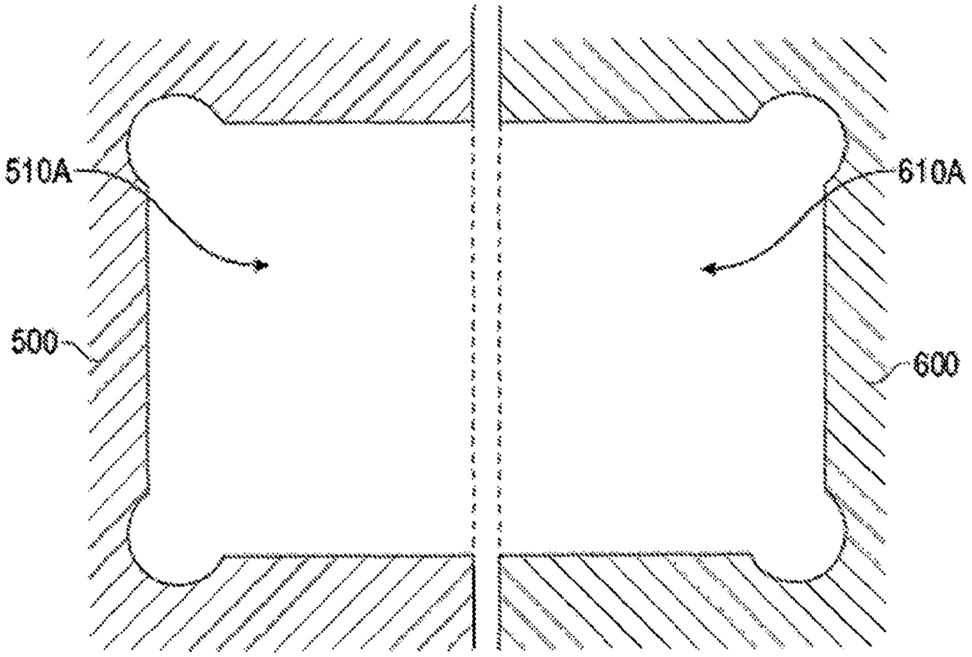
FIG. 2B is a second example of a mouse ear cut out for a first and second panel.

The first leaf assembly 20 includes a first front leaf component 22 coupled to a first rear leaf component 24 for accommodating therebetween a portion of a first panel 500 having a first cut-out section 510 as shown in FIG. 2A. The first leaf assembly 20 further includes a first insert component 40 which is tight fittingly receivable within the first cut-out section 510 of the first panel 500.

The second leaf assembly 30, which is hingedly coupled to the first leaf assembly 20, includes a second front leaf component 32 coupled to a second rear leaf component 34 for accommodating therebetween a portion of a second panel 600 having a second cut-out section 610.

The one or more biasing components 190 can be provided in the form of a spring such as a helical spring or the like.

A first portion 102 of each dampener 100 is secured or fixed within the first insert component 40 and a second portion 104 is configured to at least partially retract within the first insert component 40 when coming into contact with the second leaf assembly 30 during hinged movement toward the closed position under bias from the one or more biasing components 190. The second portion 104 of the dampener 100 extends and retracts along a longitudinal axis which is coplanar with the first panel 500.

Due to the longitudinal axis of the one or more dampeners 100 being coplanar with the first panel 500, any vibratory force is transferred in a direction parallel to the plane of the first panel 500. Due to the force being transferred along the plane of the first panel 500, the first panel 500 undergoes substantially little vibration resulting in a reduction in mechanical wear.

Figure 3:
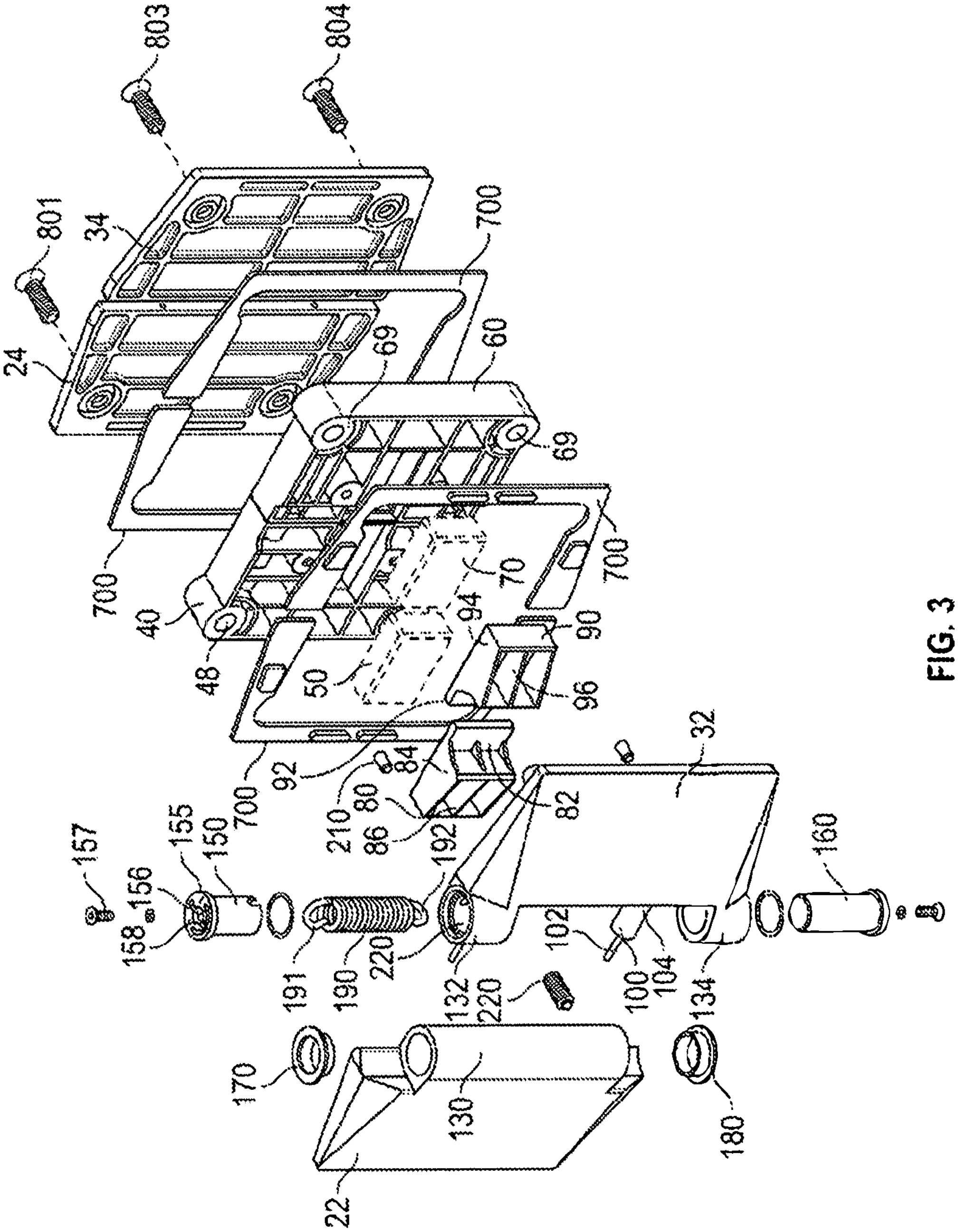
FIG. 3 is an exploded isometric view of the hinge of FIG. 1A.

In the event that the hinge 10 is biased by only a spring which has begun to wear resulting in the hinge not fully moving to the closed position, a first magnetic element 50 can be located in the first insert component 40 and a second magnetic element 70 can be located in a second insert component 60. Therefore, in this optional arrangement, the one or more biasing components include the spring 190 and a plurality of magnetic elements 50, 70. More specifically, as shown in FIG. 3, the first insert component 40 can optionally house a first magnetic element 50. Furthermore, the second leaf assembly 30 can include a second insert component 60 which can optionally include a second magnetic element 70. It will be appreciated that it is also possible that the hinge 10 includes both biasing elements including the spring 190 and the magnetic elements 50, 70 despite the spring 190 not having begun to experience mechanical wear.

Figure 6C:
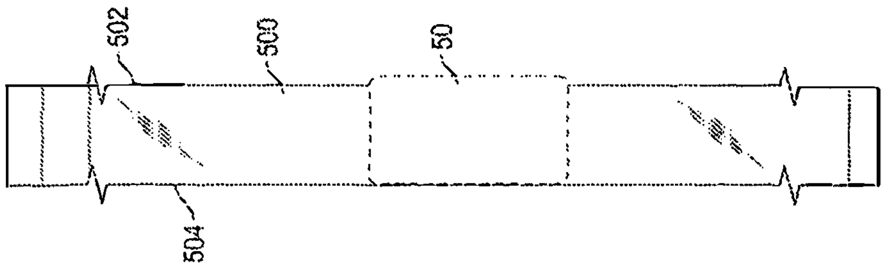
FIG. 6C is a reverse side view of the first magnetic element located substantially within the cut-out section of the first panel.
Figure 6B:
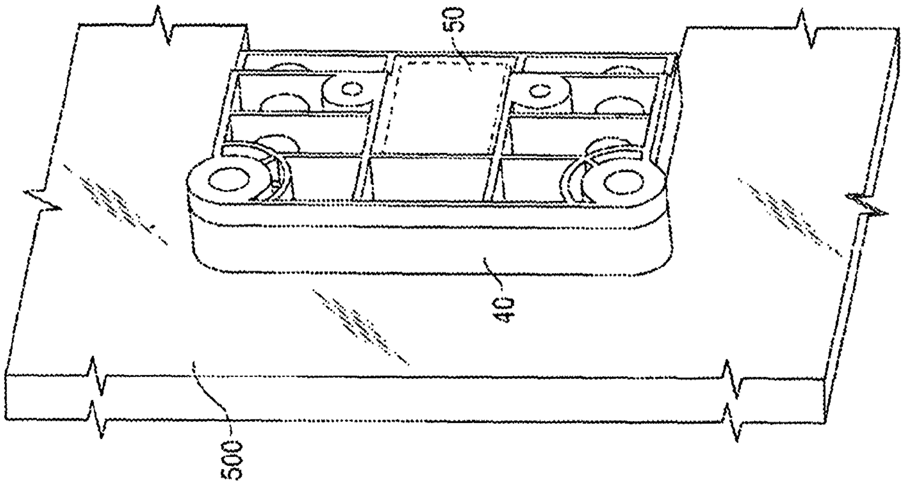
FIG. 6B is a front perspective side view of the first insert component received within the cut-out section of the first panel.
Figure 6A:
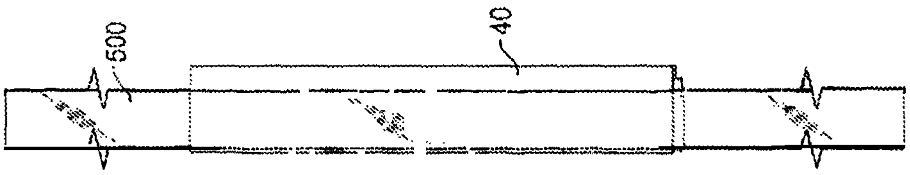
FIG. 6A is a side view of the first insert component received within the cut-out section of the first panel.
Figure 6F:
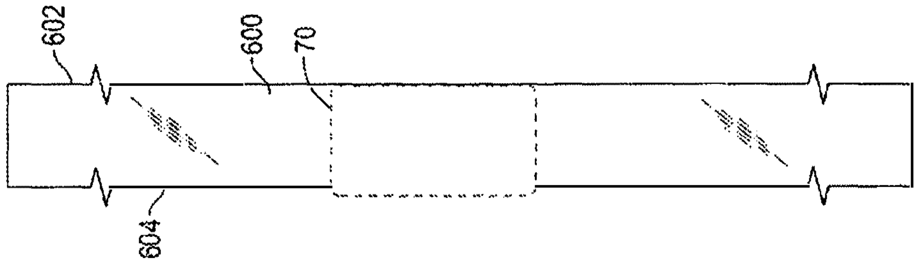
FIG. 6F is a reverse side view of the second magnetic element located substantially within the cut-out section of the second panel.
Figure 6E:
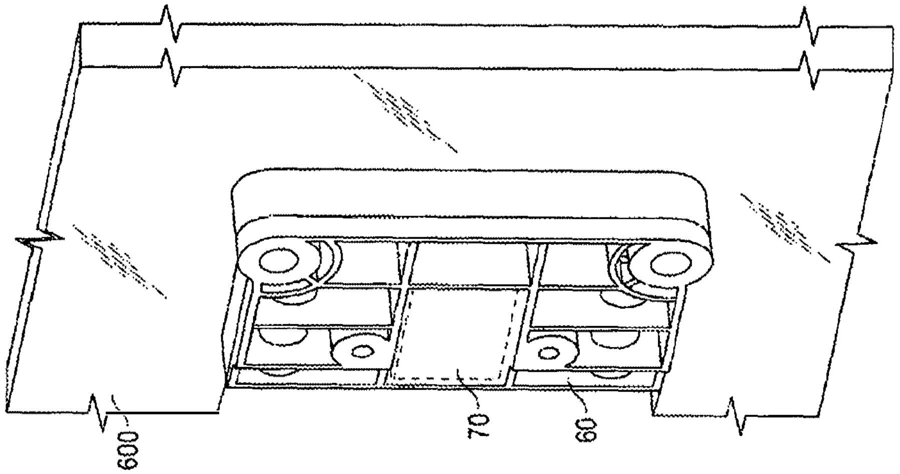
FIG. 6E is a front perspective view of the second insert component received within the cut-out section of the second panel.
Figure 6D:
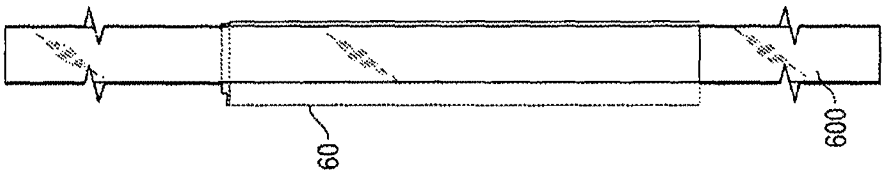
FIG. 6D is a side view of the second insert component received within the cut-out section of the second panel.
Figure 6G:
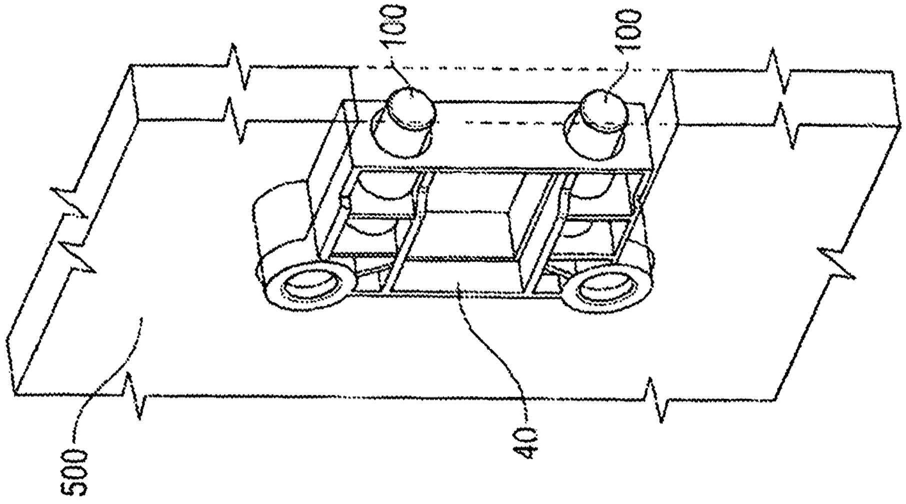
FIG. 6G is a perspective front view of the first insert component within the first cut-out section of the first panel.
Figure 6H:
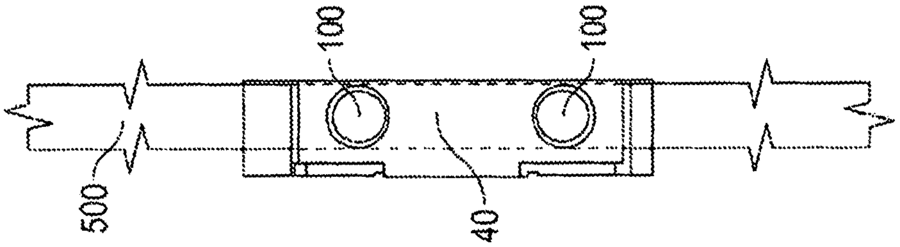
FIG. 6H is a side view of the first insert component of FIG. 6G within the first cut-out section of the first panel.
Figure 6I:
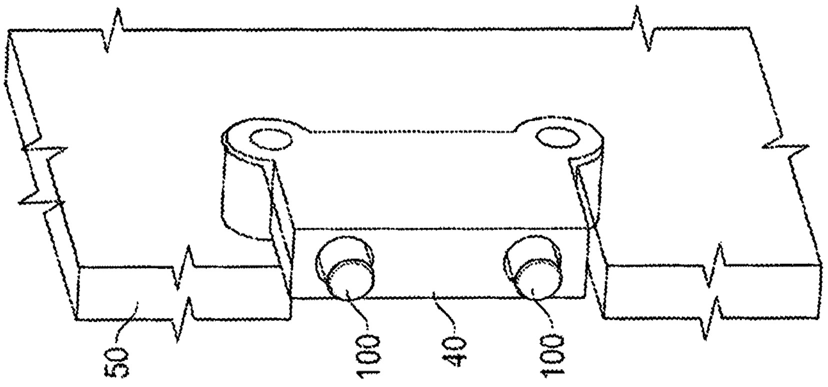
FIG. 6I is a perspective rear view of the first insert component of FIG. 6G within the first cut-out section of the first panel.

As shown in FIGS. 6A, 6B and 6C, a majority of the first insert component 40 is tight fittingly receivable by the first cut-out section 510 of the first panel 500 such that only a minority portion of the insert portion protrudes from the face of the first panel. The one or more dampeners 100 and optionally the first magnetic element 50 that can be optionally housed within the first insert component 40 which are substantially located between opposing faces 502, 504 of the first panel 500 as shown in FIGS. 6C and 6H. In particular, as shown in FIG. 6C a significant majority of the first magnetic element is located between the planes of the opposing faces 502, 504 of the first panel 500. Similar, as shown in FIG. 6H, the dampeners are wholly located between the planes of the opposing faces 502, 504 of the first panel 500.

Similarly, the second leaf assembly 30 includes a second front leaf component 32 coupled to a second rear leaf component 34 for accommodating therebetween a portion of a second panel 600 having a second cut-out section 610 as shown in FIG. 2A. The second leaf assembly 30 further includes a second insert component 60 which can optionally house a second magnetic element 70. A majority of the second insert component 60 is tight fittingly receivable by the second cut-out section 610 of the second panel 600 such that only a minority portion of the insert portion protrudes from the face of the second panel as shown in FIGS. 6D and 6E. As shown in FIG. 7E, one or more striking surfaces 64 provided by the second insert component 60, which the dampeners 100 strike when moving to the closed position, are located between opposing planes of the faces of the second panel 600 in order to achieve packing advantages. Optionally, as shown in FIG. 6F, the second magnetic element 70 can be optionally housed within the second insert component 60 which can be substantially located between planes of opposing faces 602, 604 of the second panel 600 as shown in FIG. 6F. In particular, as shown in FIG. 6F a significant majority of the second magnetic element is located between opposing faces 602, 604 of the second panel 600.

Figure 4A:
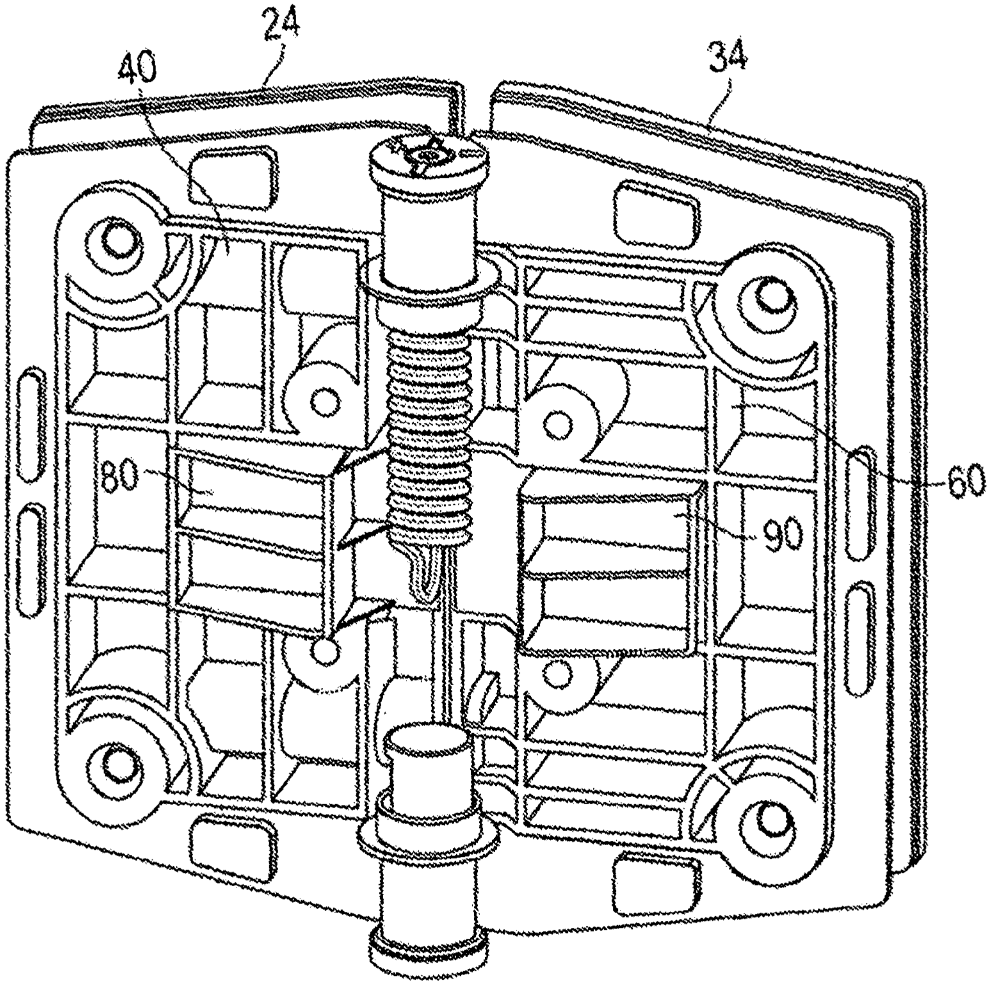
FIG. 4A is an elevated front view of the hinge of FIG. 1A with the first and second front leaf components removed.
Figure 4B:
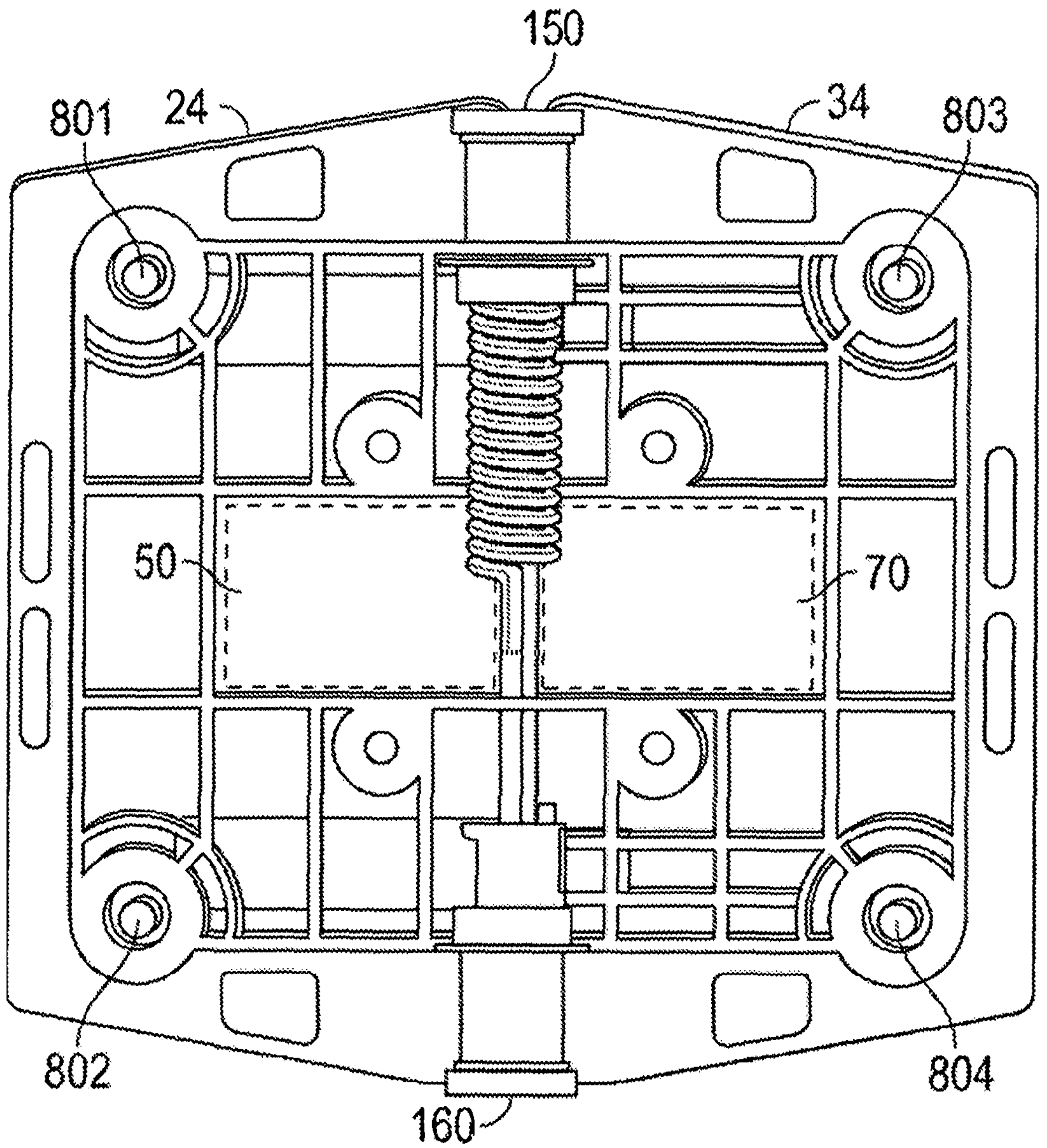
FIG. 4B is a front view of the hinge of FIG. 1A with the first and second front leaf components and the first and second spacer components removed.

As shown in FIG. 4B, in the event that the hinge 10 includes magnetic elements 50, 70, the magnetic attractive force between opposing end faces of the first and second magnetic elements 50, 70 contribute to biasing the hinge 10 to hingedly move toward a retained position to thereby operate as a self closing hinge. The magnetic attractive force between the opposing end faces of the first and second magnetic elements 50, 70 also contribute toward maintaining the hinge 10 in the retained position.

Due to the dampeners 100 being located between the planes of the opposing faces 502, 504 of the first panel 500, and optionally the first magnetic element 50 and the second magnetic element 70 being substantially located between opposing faces 502, 504, 602, 604 of the first and second panels 500, 600 respectively, the first leaf assembly 20 and the second leaf assembly 30 can be manufactured with a thinner profile meaning that the hinge 10 can be manufactured using less material. Furthermore, as shown in FIG. 4B which depicts the hinge in the closed or retained positon with the front leaf components 22, 32 being removed for clarity, the first and second magnetic elements 50, 70 are substantially collinear in the retained position and orthogonal to a hinge axis. The collinear arrangement avoids an overlapping magnetic element arrangement in the retained position thereby providing a more efficient packing of the hinge 10 compared to prior art hinges. As the packing of the hinge leaf assemblies 20, 30 can be reduced due to the collinear arrangement of the magnetic elements 50, 70 in the retained position, the hinge 10 can be manufactured more economically.

Preferably, the first magnetic element 50 has a thickness which substantially corresponds to a thickness of the first panel such that the opposing faces of the first magnetic element are substantially coplanar with the opposing faces 502, 504 of the first panel 500 as shown in FIG. 6C. Similarly, the second magnetic element has a thickness which substantially corresponds to a thickness of the second panel 600 such that the opposing faces 602, 604 of the second magnetic element 70 are substantially coplanar with the opposing faces of the second panel as shown in FIG. 6F. As such, the cut-out sections 510, 610 of the panels 500, 600 define a suitable cavity that can accommodate the suitably sized magnetic elements 50, 70 which can contribute towards biasing the hinge 10 toward the retained position as shown in FIG. 1A.

Referring to FIG. 3, there is shown an exploded isometric view of the hinge 10 of FIG. 1A. The first insert component 40 and second insert component 60 have a mouse ear shaped profile that corresponds to the mouse ear cut-out sections 510, 610 provided in the panels 500, 600 shown in FIG. 2A. The mouse ear shaped corners of the first and second insert components 40, 60 contribute toward restricting rotational movement between the hinge 10 and the panels 500, 600. The first and second insert components 40, 60 include a first and second cavity 42, 62 respectively for tight fittingly receiving the first and second magnetic elements 50, 70 respectively if required. The cavities 42, 62 have a rectangular prism profile which corresponds to the rectangular cross-sectional profile of the first and second magnetic elements 50, 70. The first and second cavities 42, 62 are deeper than the thickness of the first and second magnetic elements 50, 70 wherein the excess space provided by the first and second insert components 40, 60 accommodate a cover portion 82, 92 of a first and second spacer component 80, 90 respectively. As shown in FIG. 4A, each cover portion 82, 92 has a profile that substantially corresponds to both the magnetic elements 50, 70 and the profile of the cavities 42, 62 of the first and second insert components 40, 60. Each spacer component 80, 90 includes a spacer body 84, 94 defined by a plurality of ribs 86, 96 which extend from the cover portion 82, 92 and rest upon an inner surface of the respective front leaf component 22, 32. As shown in the figures, the front leaf components 22, 32 include a tapered profile, wherein the spacer component ribs include a corresponding tapered profile to rest flush against the inner surface of the respective front leaf components 22, 32.

Figure 7B:
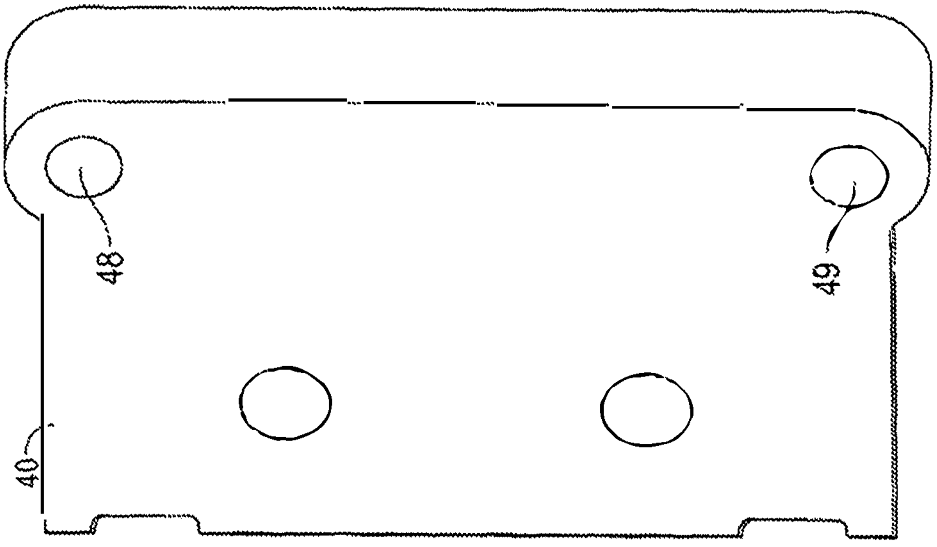
FIG. 7B is a rear view schematic of the first insert component of the hinge of FIG. 1A.
Figure 7A:
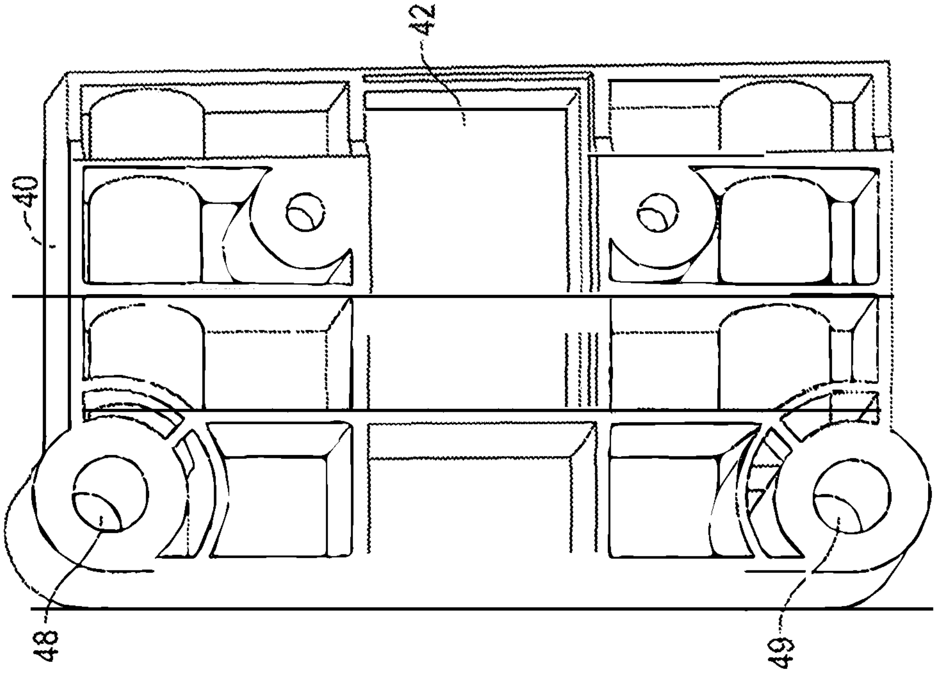
FIG. 7A is a front view schematic of the first insert component of the hinge of FIG. 1A.
Figure 7C:
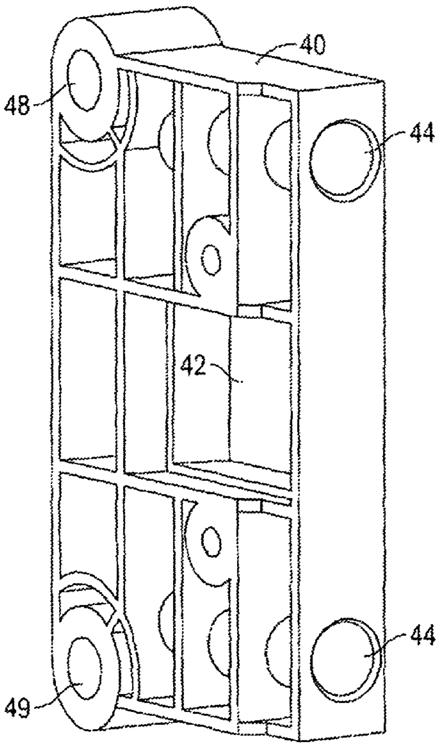
FIG. 7C is a side view schematic of the first insert component of the hinge of FIG. 1A.
Figure 13:
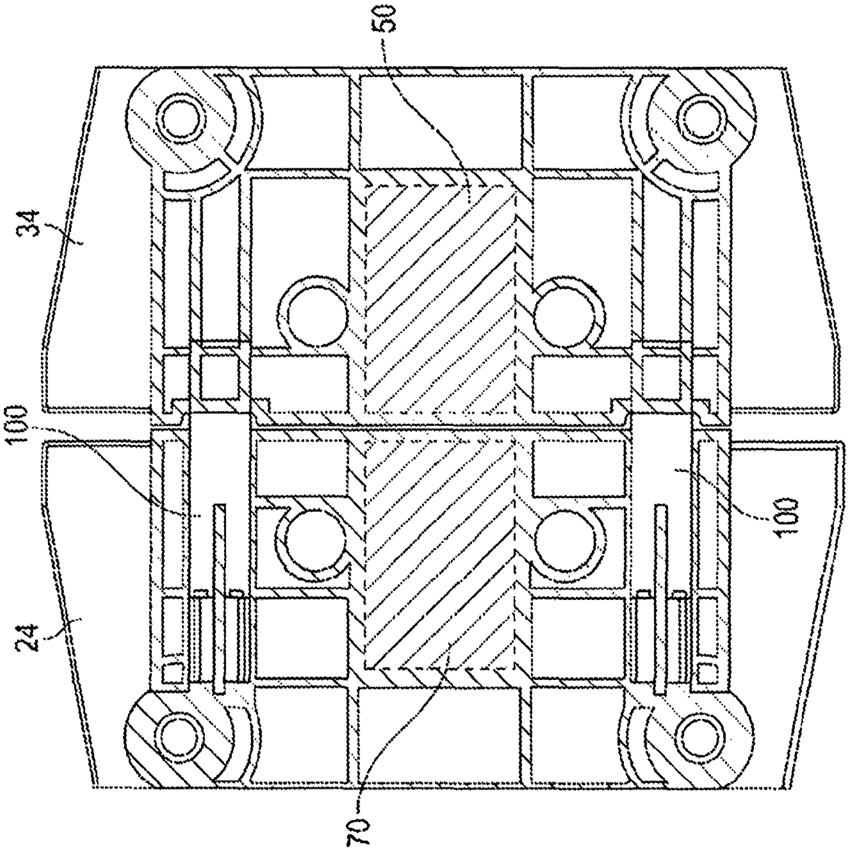
FIG. 13 is a cross-sectional view of the hinge of FIG. 1A through line B-B shown in FIG. 10.

As shown in FIGS. 7A, 7B and 7C, the first insert component 40 includes a plurality of hollows 44 which have a longitudinal axis which is orthogonal to the hinge axis 290 and coplanar with the plane of the first panel 500. The hollows 44 are located along adjacent longitudinal edges of the cavity 42 for housing the first magnetic element 50. Each hollow 44 is configured to house at least a portion of a dampener 100 as shown in FIGS. 3 and 13 for reducing the speed which the hinge approaches the retained position. As shown in FIG. 13, at least a portion 102 of each dampener 100 is located within a respective hollow 44 of the first insert component 40 and a second portion 104 of the dampener 100 at least partially retracts within the respective hollow 44 of the first insert component 40 when the second portion 104 of the dampener 100 comes into contact with the second insert component 60 during hinged movement toward the retained position. The second portion 104 of the dampener 100 extends and retracts along an axis which is coplanar with the first panel 500. The first portion 102 of the dampener 100 is a dampener pin which is coupled within a respective hollow 44 of the first insert component 40. Furthermore, the second portion 104 of the dampener 100 is a dampener body which at least partially extends from and at least partially retracts within the respective hollow 44 of the first insert component 40. As shown in FIG. 13, the dampener pin 102 is substantially thinner than the dampener body 104. Due to the dampener pin 102 being secured within the respective hollow 44 and the dampener body 104 having a cross sectional profile which substantially corresponds to the cross sectional profile of the respective hollow 44, the dampener pin 102 is less likely to deflect and bend during hinge movement toward the retained position. The substantially similar cross sectional profiles between each dampener body 104 and the hollow 44 effectively acts as a guide such that each dampener body 104 receives therein the dampener pin 102 along the longitudinal axis of the respective hollow 44. As the orientation of the longitudinal axis of the one or more dampeners 100 is substantially coplanar with the first panel 500, the overall thickness of the hinge leaf component 20 can be reduced thereby providing material efficiencies in relation to manufacture of the hinge. Additionally, due to the orientation of the dampeners 100, a majority of the vibrational force experienced by the hinge 100 when approaching the retained position is transferred in a direction substantially parallel to the planes of the faces 502, 504, 602, 604 of the panels 500, 600, thereby reducing the stress on the panels when moving toward the retained position.

Figure 7D:
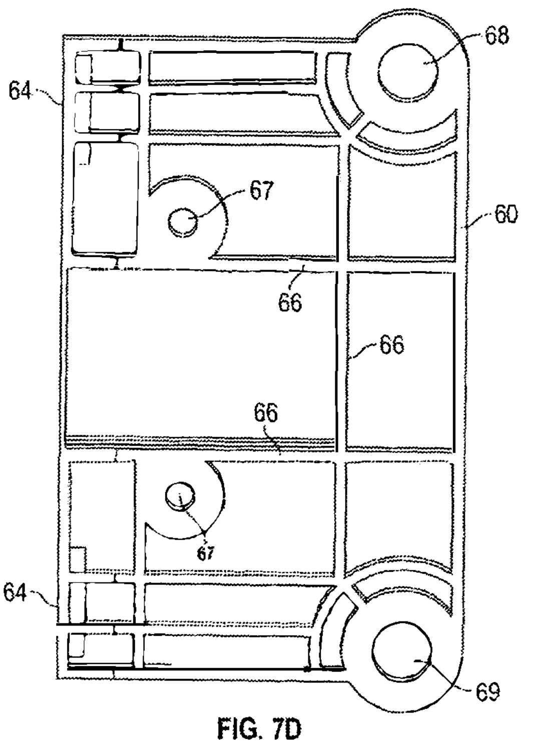
FIG. 7D is a front view of the second insert component of the hinge of FIG. 1A.
Figure 7E:
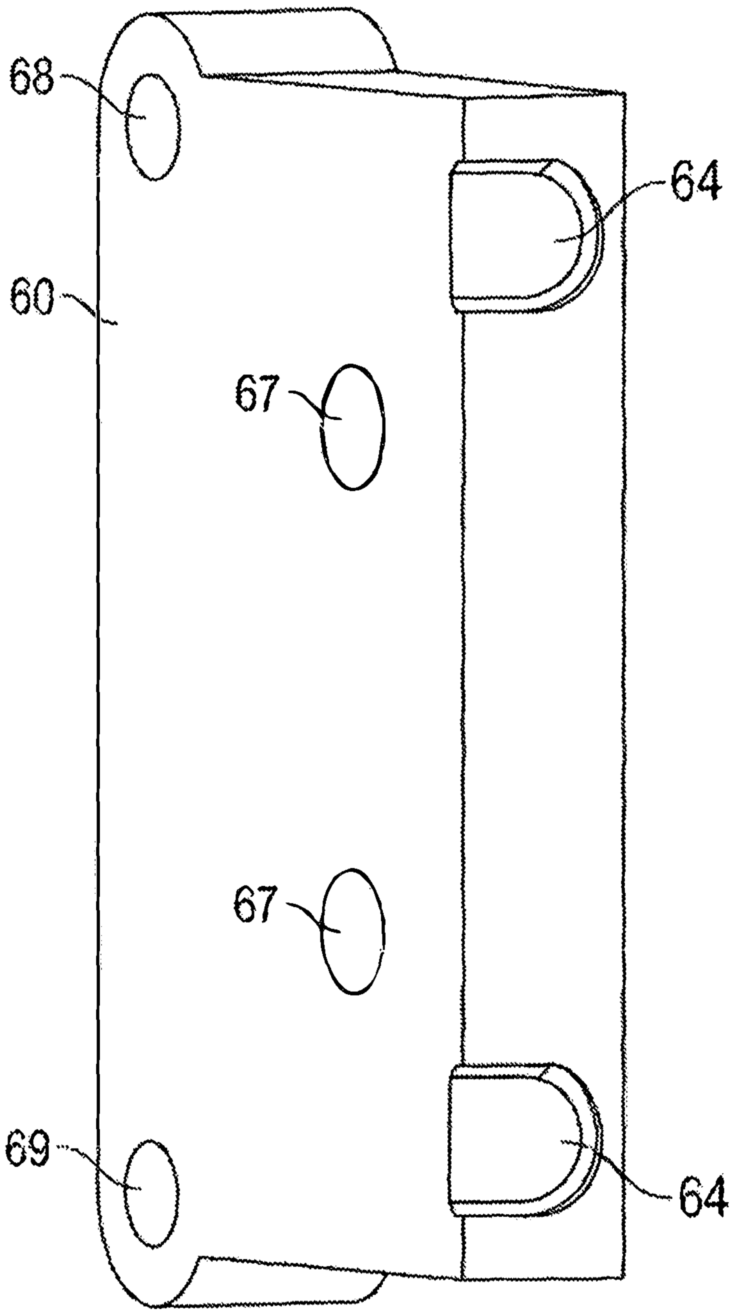
FIG. 7E is a rear side view of the second insert component of the hinge of FIG. 1A.

As shown in FIGS. 7D and 7E, the second insert component 60 includes a striking surface 64 including a plurality of indentations for receiving therein an end of each dampener body when moving toward the retained position. The second insert component 60 includes a plurality of ribs 66 to provide structural strength. The second insert component can also include additional holes 67 for fasteners to fasten the second insert component 60 to the inner surface of the second front leaf component 32.

Preferably, the first and second insert components 40, 60 are injection moulded components in order to further reduce the manufacturing costs of the hinge. In a preferable form the first and second insert components 40, 60 are made from a polymer material. The first and second front and rear leaf components 22, 24, 32, 34 are made from stainless steel.

Figure 5A:
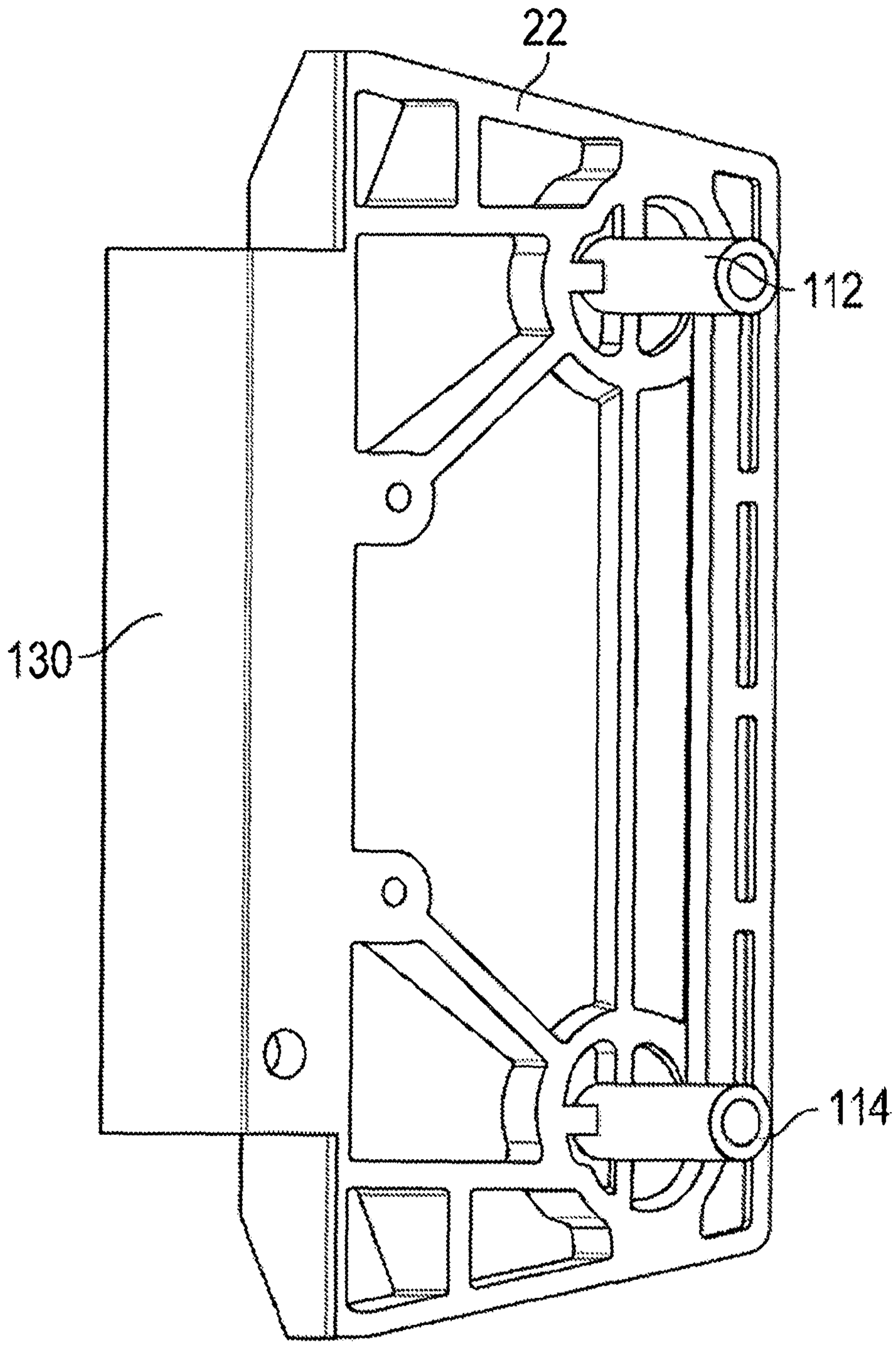
FIG. 5A is a rear side view of an underside surface of the first front leaf component of the hinge of FIG. 1A.

As shown in FIGS. 7A, 7B and 7C, the first insert component 40 includes a first and second hole 48, 49 for receiving therethrough a first and second threaded stem 112, 114 protruding from the inner surface of the first front leaf component 22 as shown in FIG. 5A. A first and second fastener 801, 802, as shown in FIGS. 4A and 4B, are received through corresponding holes of the first rear leaf component 24, as shown in FIG. 3, and fasten with the first and second threaded stems 112, 114 respectively to secure the first insert component 40 between the first front leaf component 22 and the first rear leaf component 24.

Similarly, the second insert component 60 includes a third and fourth hole 68, 69 for receiving therethrough a third and fourth threaded stem 122, 124 of the second front leaf component 32. A third and fourth fastener are received through corresponding holes of the second rear leaf component 34, as shown in FIGS. 3, 4A and 4B, and fasten with the first and second threaded stems 112, 114 respectively to secure the second insert component 60 between the second front leaf component 32 and the second rear leaf component 34. The first, second, third and fourth holes 48, 49, 68, 69 of the first and second insert components 40, 60 are preferably provided at the mouse ear corner sections of the respective components 40, 60. The first and second insert components 40, 60 can further include additional holes, as shown in FIGS. 4A and 4B, to allow fasteners to secure the respective insert components 40, 60 to the inner surface of the first and the second front leaf components 22, 32 which include threaded holes 116, 118 to receive threaded fasteners.

Referring to FIG. 3, the first front leaf component 22 includes an intermediary knuckle 130 and the second front leaf component 32 includes a first knuckle 132 and a second knuckle 134 wherein the intermediary knuckle 130, the first knuckle 132 and the second knuckle 134 are coaxial in the assembled state, as shown in FIG. 1A, to form a hinge barrel 140.

The barrel 140 further includes a first cap 150 including a first cap neck 152 which extends through the first knuckle 132 and protrudes within the intermediate knuckle 130. Furthermore the barrel 140 further includes a second cap 160 including a second cap neck 162 which extends through the second knuckle 134 and protrudes within the intermediate knuckle 130 thereby joining the respective knuckle sections 130, 132, 134 together to define the barrel 140. The barrel 140 can further include a first bush component 170 which engages with a first end 136 of the intermediate knuckle 130, and a second bush component 180 which engages with a second end 138 of the intermediate knuckle 130. The bush components 170, 180 enable rotational movement between the first and intermediary knuckle 130, 132 and between the second and intermediary knuckle 134, 130.

Figure 5D:
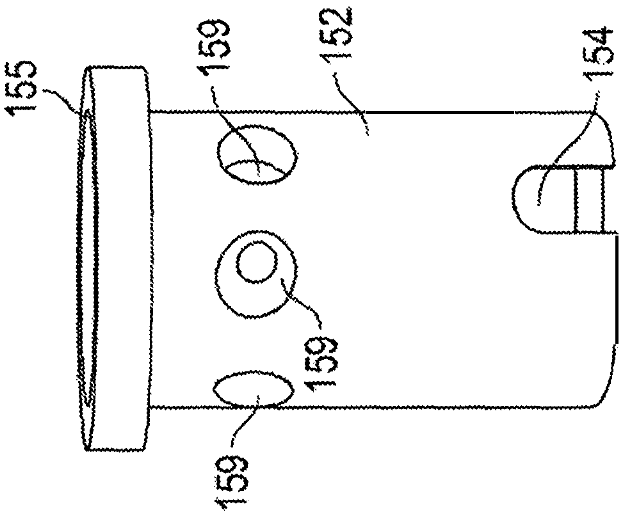
FIG. 5D is a front view of a first end cap of the hinge of FIG. 1A.
Figure 5B:
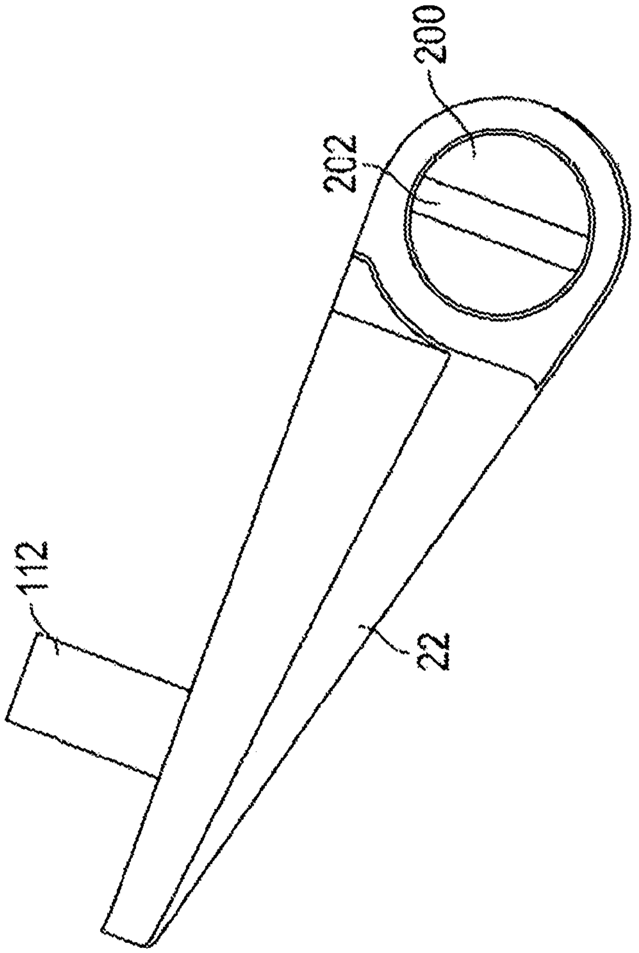
FIG. 5B is an elevated top view of the first front leaf component of the hinge of FIG. 1.
Figure 5C:
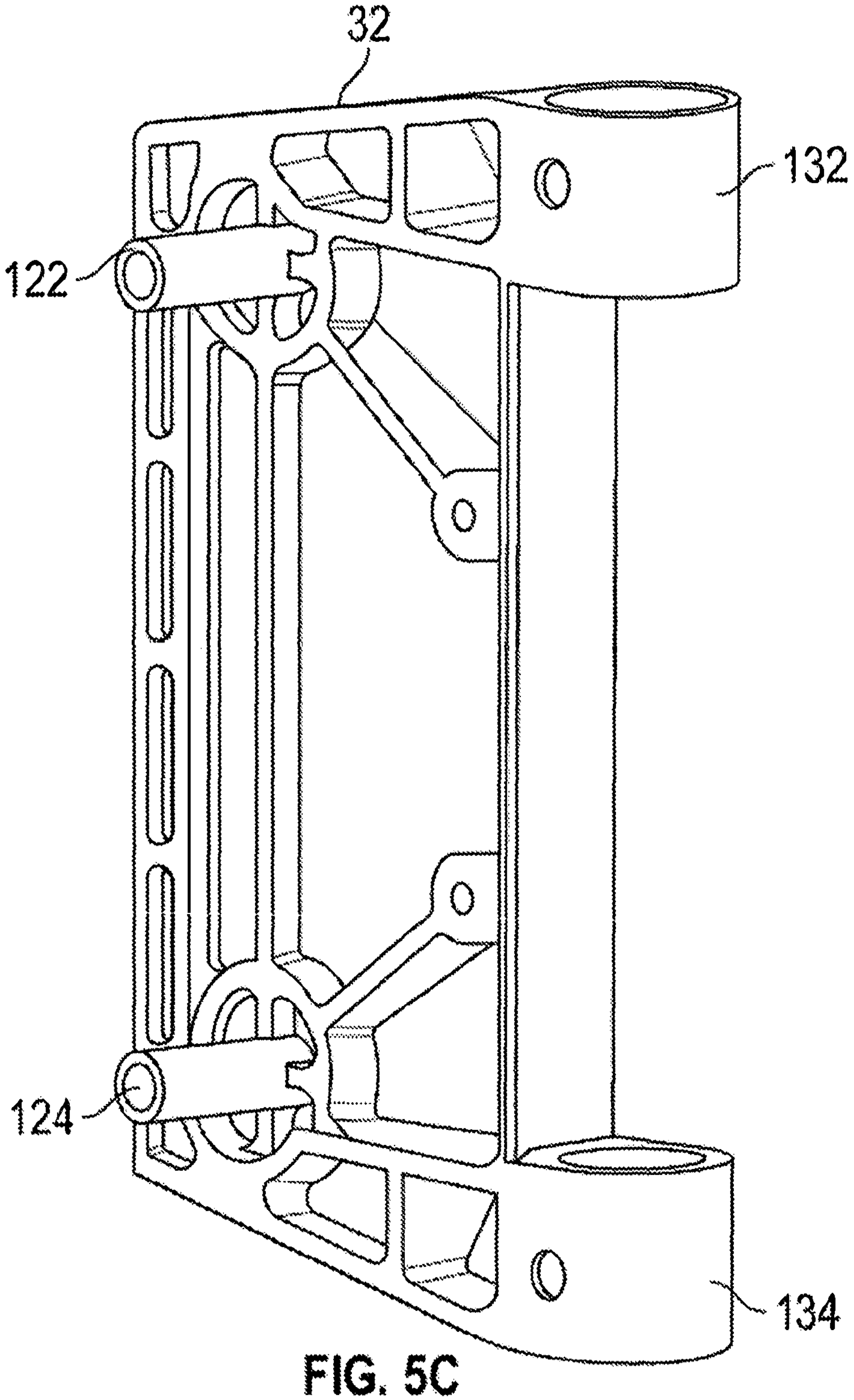
FIG. 5C is a rear side view of an underside surface of the second front lead component of the hinge of FIG. 1A.

As shown in FIGS. 3, the hinge 10 further includes a torsion spring 190 located within the barrel 140 having a first end 192 coupled to one of the first and second caps 150, 160, wherein a second end 194 of the torsion spring 190 is coupled to the intermediary knuckle 130. Hinge movement of the hinge 10 away from the retained position causes potential energy to increase in the torsion spring 190 to thereby contribute toward biasing the hinge 10 toward the retained position. The torsion spring 190 includes a first spring tail 192 having a rounded profile which is received within a slot 154 in the wall of the first cap neck 152 as shown in FIGS. 3 and 5D. Similarly the spring 190 further includes a second spring tail 194 having a curved profile that is receivable through a slot 202 in a wall 200 that extends across the inner surface of the intermediary knuckle 130.

As shown in FIG. 3, the first cap 150 includes a tool slot 156 located in the cap head 155 to receive a tool, such as a flat blade screwdriver, wherein the first cap 150 can be rotated by rotational actuation of the screw driver to thereby increase the potential energy stored in the torsion spring 190. As shown in FIG. 5D, the outer surface of the first cap neck 152 includes a plurality of indentations 159 to receive a grub screw 210 (see FIG. 3) which can be actuated using a tool such as an Allen key to project through a hole 220 in the first knuckle 132 to align and engage with one of the indentations 159 in the first cap neck 152. Therefore, a user can increase the potential energy stored in the spring 190 by rotating the first cap 150 to and then actuate the grub screw 210 to engage with one of the indentations 159 to thereby maintain the increased potential energy in the spring 190.

Figure 14:
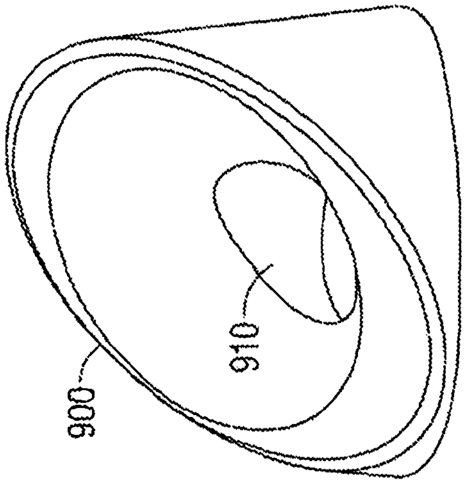
FIG. 14 is an isometric view of a cap cover for use with the hinge of FIG. 1A.
Figure 17A:
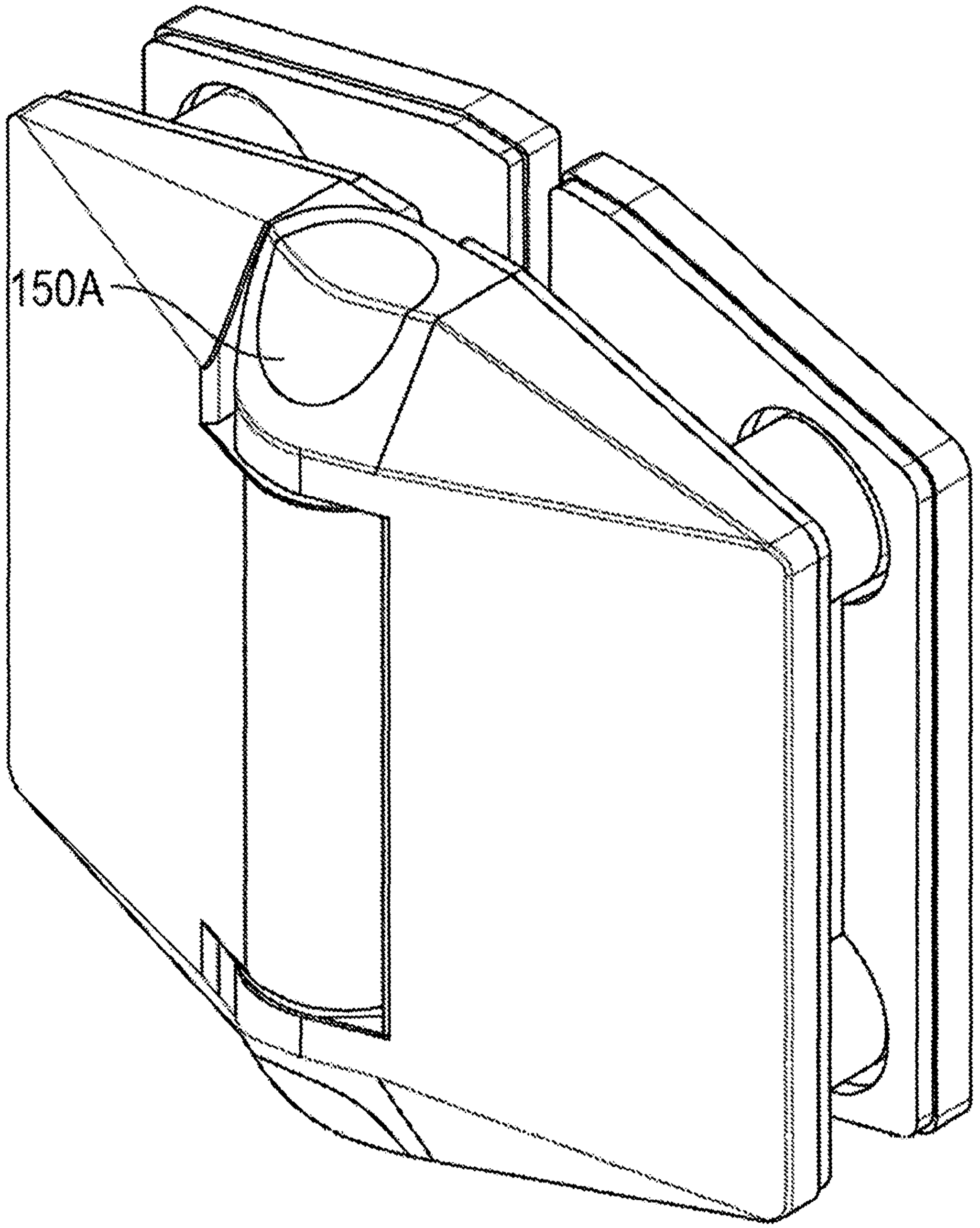
FIG. 17A is an isometric view of a third example of a hinge.
Figure 17B:
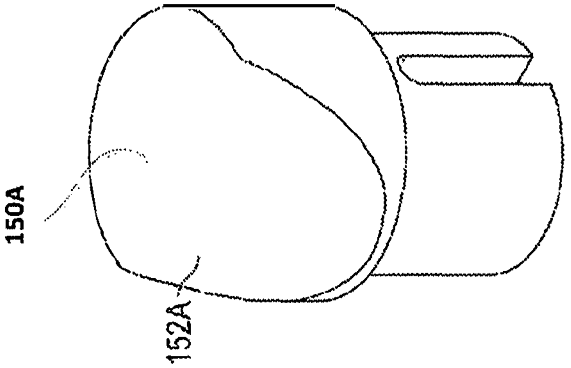
FIG. 17B is an isometric view of the first cap of the hinge of FIG. 17A.

As shown in FIG. 3, the top of the first cap 150 includes a central hole 158 for receiving a threaded screw 157. The threaded screw 157 must be unthreaded from the central hole 158 in order to allow the tool head of the screwdriver to engage the slot in order to apply rotational force to the first cap 150. Once the grub screw 210 has been actuated to engage with one of the indentations 159, the screw 157 can be reinserted into the hole 158. As shown in FIGS. 17A and 17B, an alternate first cap 150A may be provided which can include an angled upper surface 152A to prevent the first cap 150A being used as a step. In an alternative, as shown in FIG. 14, an angled cap member 900 can be fastened to the flat cap head 155 of the first cap 150. The angled cap member 900 has an angled surface which includes a central hole 910 which can receive the screw 157 to secure the angled cap member 900 to the first cap 150.

Figure 8:
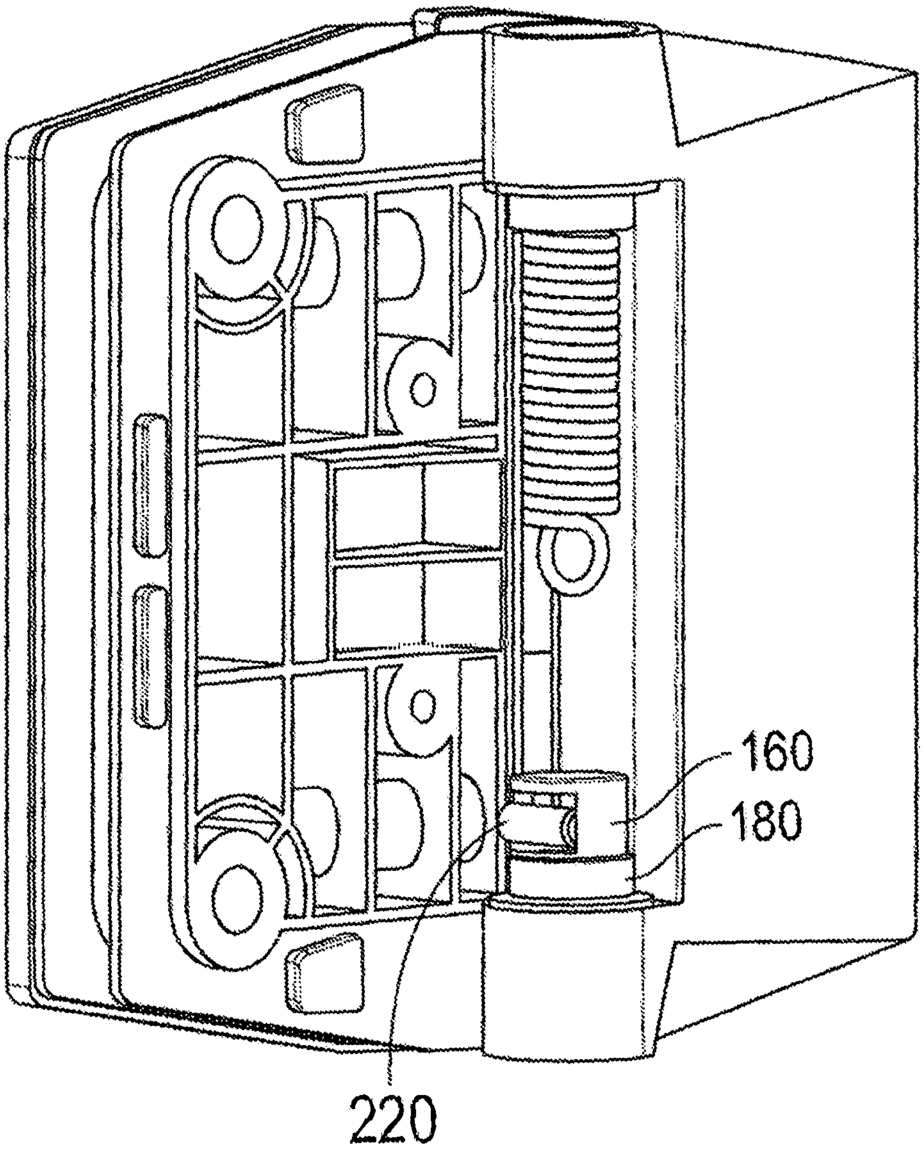
FIG. 8 is a schematic of the hinge of FIG. 1A with the first front leaf component removed.
Figure 9A:
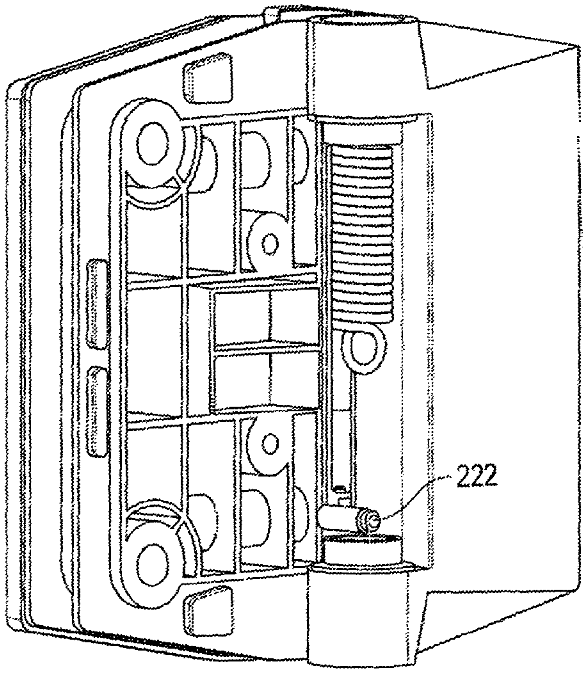
FIG. 9A is a schematic of the hinge of FIG. 1A with the first front leaf component and the second cap removed.
Figure 9B:
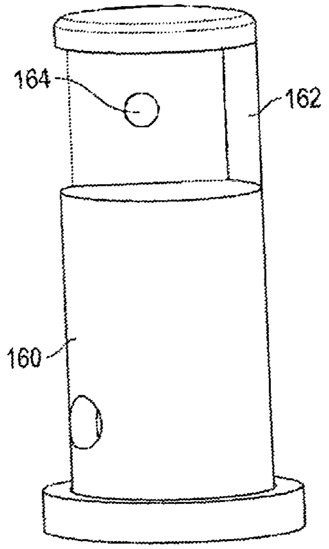
FIG. 9B is a front view of the second cap of the hinge of FIG. 1A.
Figure 10:
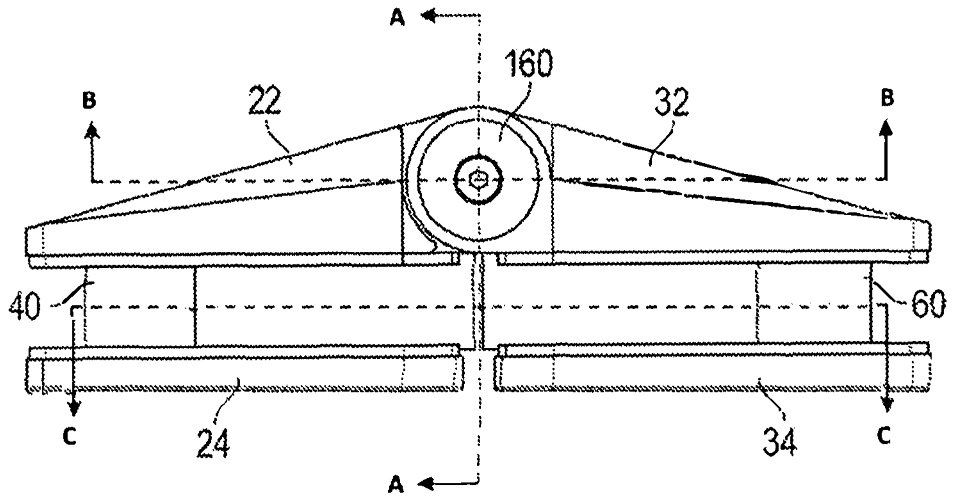
FIG. 10 is a bottom view of the hinge of FIG. 1A.
Figure 11:
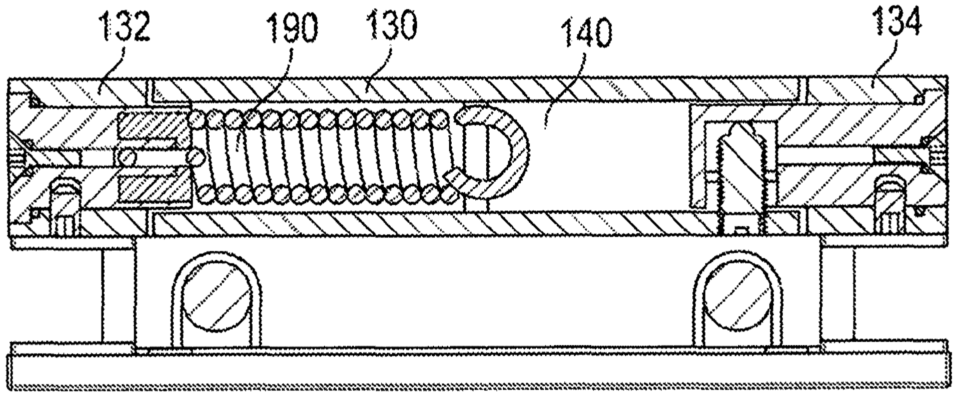
FIG. 11 is a cross-sectional view of the hinge of FIG. 1A through line C-C shown in FIG. 10.
Figure 12:
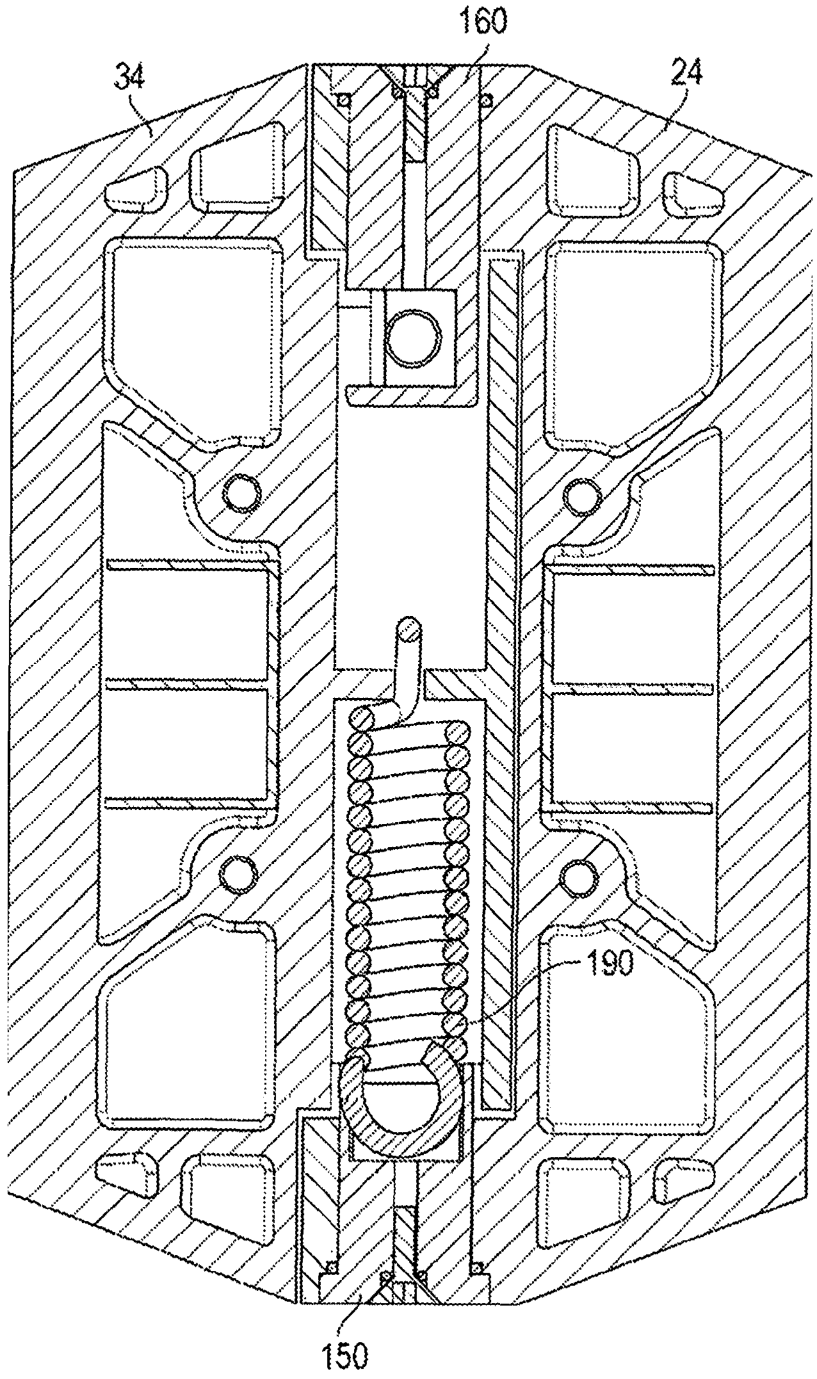
FIG. 12 is a cross-sectional view of the hinge of FIG. 1A through line A-A shown in FIG. 10.

Referring to FIGS. 3, 8 and 9, the hinge 10 further includes a spring loaded component 220 mounted to the first insert component 40. The spring loaded component 220 includes a ball 222 which rolls in contact with an inner surface of the second cap neck 162 during hinged movement. The second cap neck 162 has a semi-cylindrical profile to allow the spring loaded component to extend within the barrel 140 to enable the ball to roll along the inner surface of the second cap neck. As shown in FIG. 10, the inner surface of the second cap neck 162 includes an indentation 164 to partially accommodate the ball 222 when the hinge 10 moves to an open position. The ball 222 is biased by the spring loaded component 220 to remain at least partially within the indentation 164 to releasably hold the hinge 10 in the open position until an external rotational force is applied to dislodge the ball 222 from the indentation 164. Preferably, the indentation 164 is located on the inner surface of the second cap neck 162 such that the hinge 10 is releasably held open at a 90 degree orientation wherein the first and second panels 500, 600 are orthogonally orientated.

Figure 15:
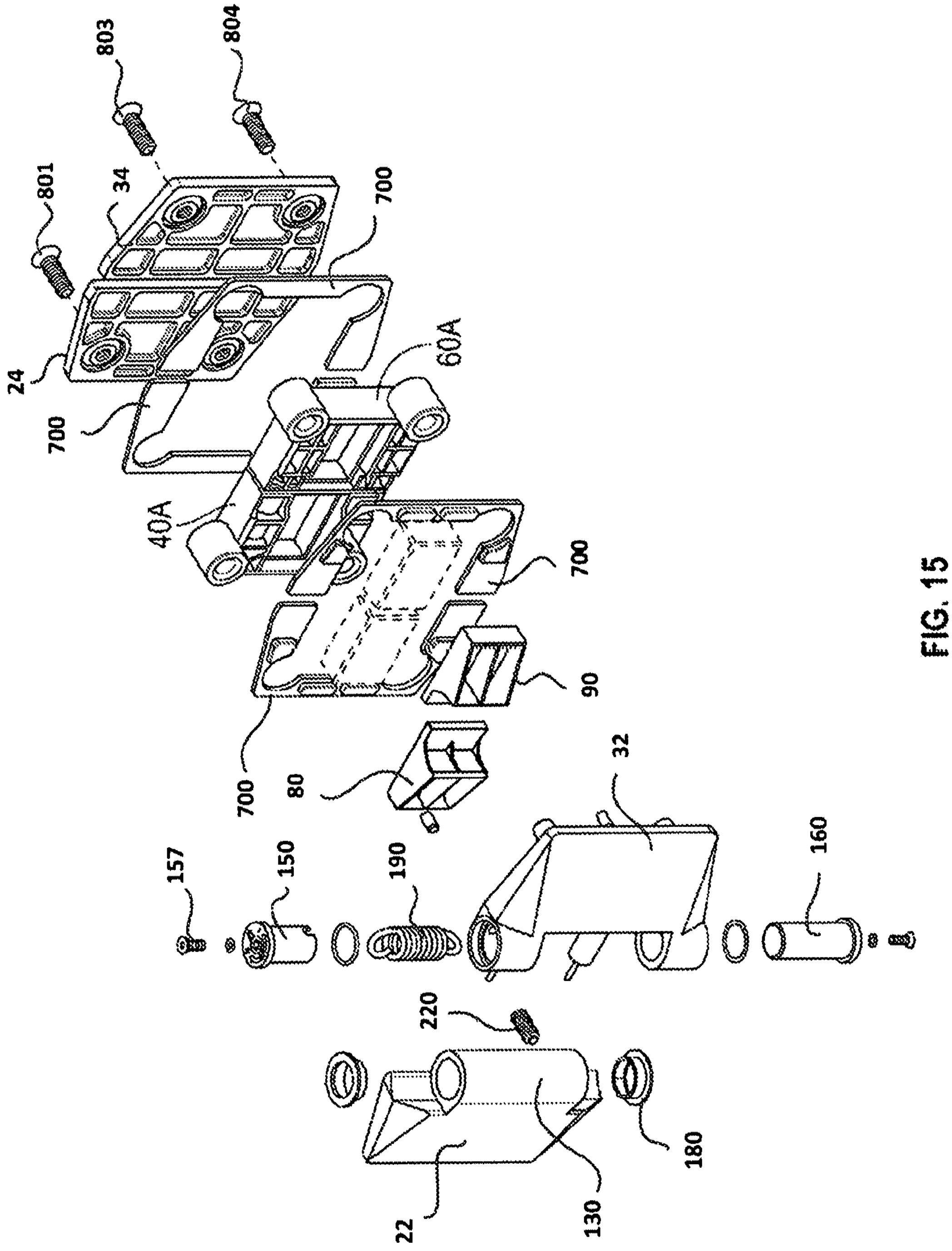
FIG. 15 is an exploded isometric view of a second example of a hinge.
Figure 16B:
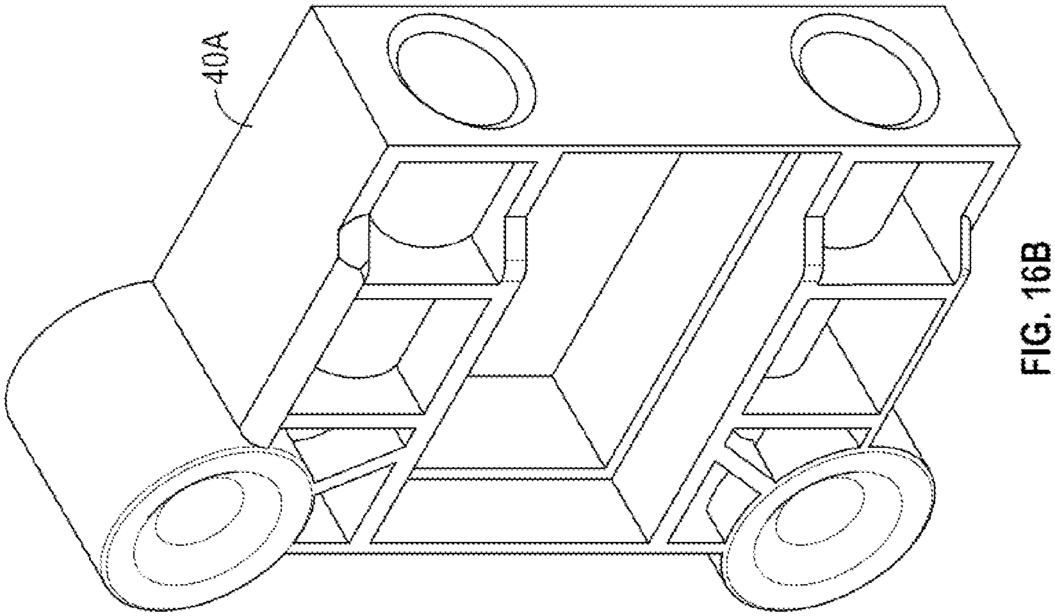
FIG. 16B is a front side view schematic of the first insert component of the hinge of FIG. 15.
Figure 16A:
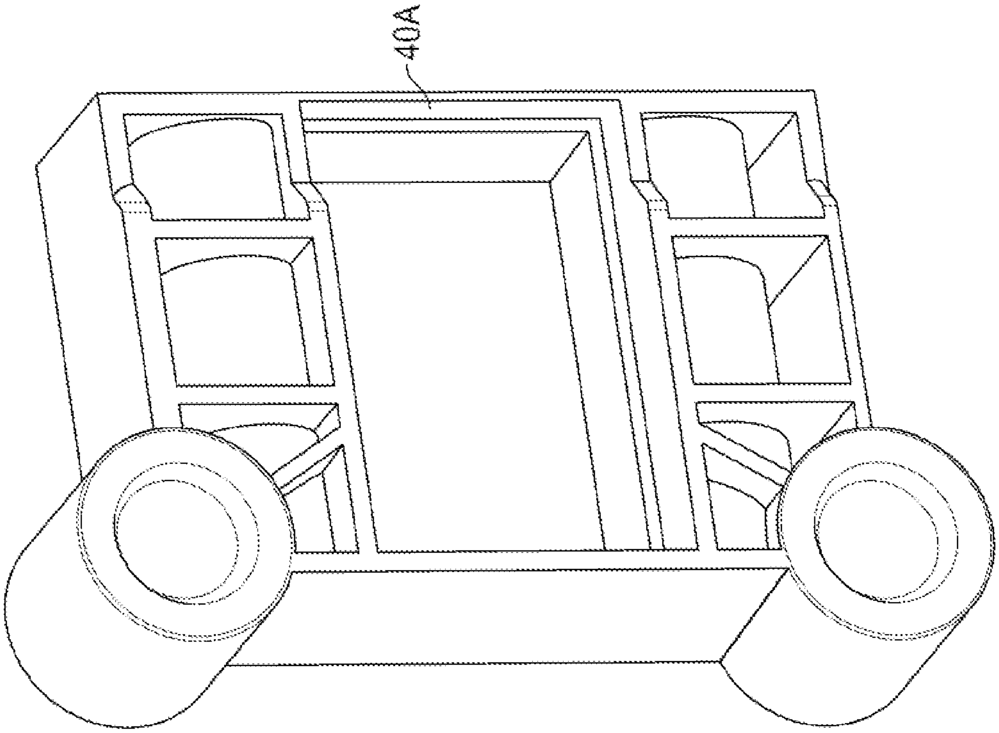
FIG. 16A is a front view schematic of a first insert component of the hinge of FIG. 15.
Figure 16C:
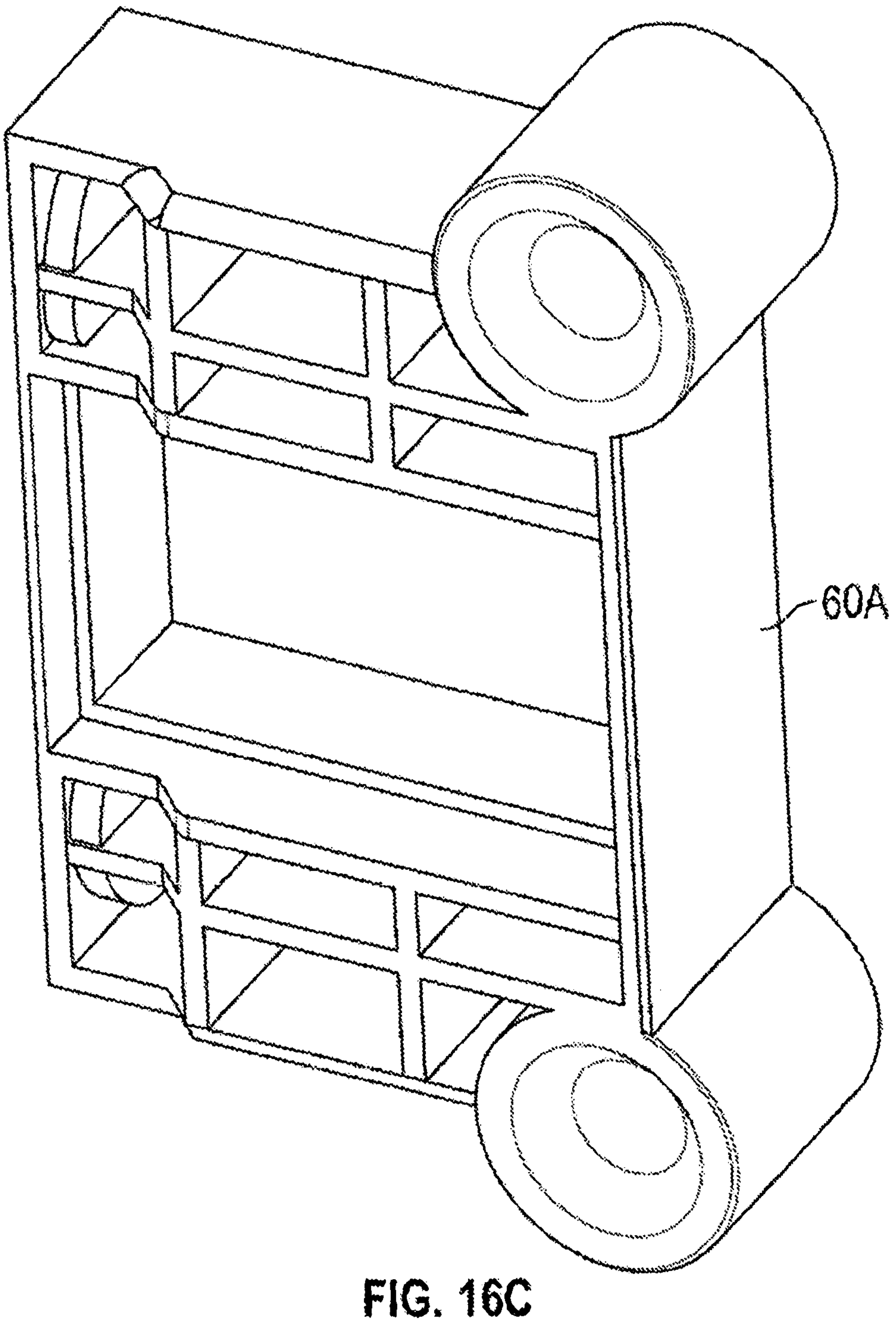
FIG. 16C is a front view schematic of the second insert component of the hinge of FIG. 15.

Referring to FIG. 2A there is shown an alternate mouse ear shaped cut-out section 510A, 610A provided in panels 500, 600. A correspondingly shaped first and second insert component 40A, 60A are shown in FIGS. 15A and 15B. As clearly shown in FIGS. 15, 16A, 16B and 16C, the mouse ear corner portions of the first and second insert components 40A, 60A extend beyond the side surfaces of the respective components. However, as shown in FIGS. 15B and 15C, the insert components 40A, 60A operate in substantially the same manner as that discussed above, wherein the first and second insert components 40A, 60A are located substantially between the opposing faces 502, 504, 602, 604 of the first and second panels 500, 600 respectively.

Figure 18B:
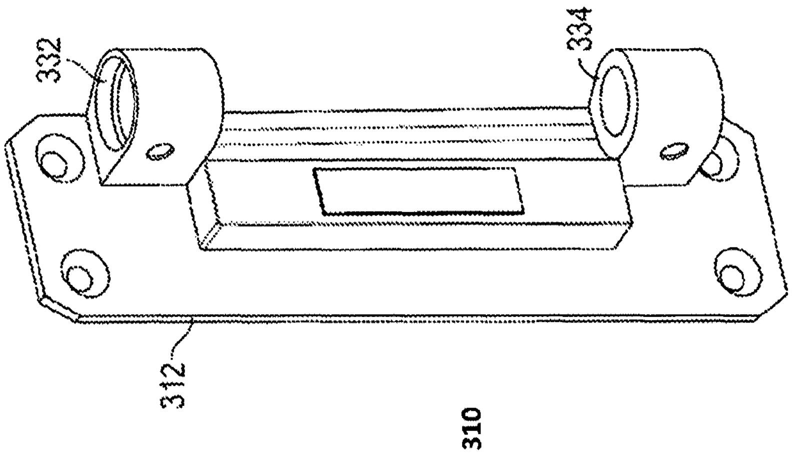
FIG. 18B is a schematic of the mounting component of the hinge of FIG. 18A
Figure 18A:
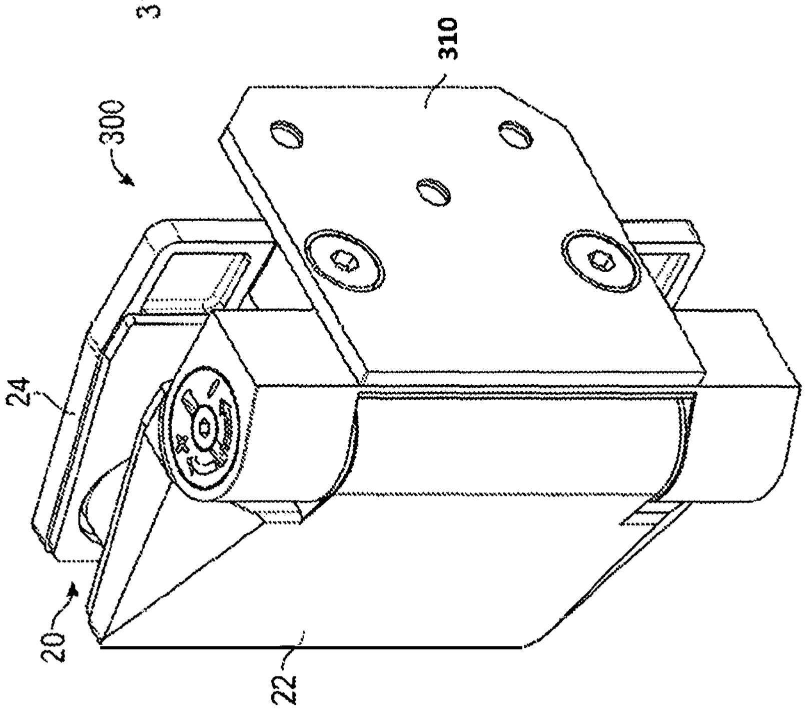
FIG. 18A is an isometric view of a fourth example of a hinge.

Referring to FIG. 18A there is shown an isometric view of another example of a hinge 300. In particular, the hinge 300 includes a leaf assembly 20 which comprises of the same components as that of the first leaf assembly 20 described in relation to FIG. 1A except the insert component corresponds to that of FIGS. 16A, 16B and 16C. For the purposes of clarity, like reference numerals are used to identify like parts throughout the figures. The leaf assembly 20 includes a front leaf component 22 coupled to a rear leaf component 24 for accommodating therebetween a portion of a panel 500 having a cut-out section 510A. The hinge 300 further includes an insert component 40A including a first magnetic element 50. The insert component 40A is tight fittingly receivable by the cut-out section 510A such that the first magnetic element 50 is located substantially between opposing faces 502, 504 of the panel 500. It will be appreciated that leaf assembly 300 is configured the same to described in relation to the first leaf assembly 20 for the hinge of FIG. 14 which includes the same insert component 40A.

The hinge 300 further includes a mounting assembly 310 hingedly coupled to the leaf assembly 20. The mounting assembly 310 houses a second magnetic element 330. The magnetic attractive force between the first and second magnetic elements 50, 330 contribute to biasing the hinge 300 to hingedly move toward a retained position as shown in FIG. 18A. As discussed above, the magnetic attractive force also contributes toward maintaining the hinge 300 in the retained position.

Similarly to the first leaf assembly 20, the first magnetic element 50 of the leaf assembly 20 has a thickness which substantially corresponds to a thickness of the panel 500 such that opposing faces of the first magnetic element 50 are substantially coplanar with the opposing faces 503, 504 of the panel 500. Furthermore, similarly to the first leaf assembly 20, the insert component 40A includes a cavity 42 for optionally receiving therein the first magnetic element 50 if required. The hinge 300 further includes a spacer component 80 which includes a cover portion 82 for substantially covering the first magnetic element 50 within the cavity 42 and spaces the insert component 40A from the front leaf component 22 of the leaf assembly 20.

The hinge 300 includes a dampener 100 to slow movement of the hinge 300 toward the retained position. The dampener 100 includes a first portion located within the insert component 40A and a second portion which at least partially retracts within the insert component 40A when coming into contact with the mounting assembly 310 during movement toward the retained position. The second portion of the dampener 100 extends and retracts along an axis which is parallel and coplanar with the panel 500. The first portion of the dampener 100 is a dampener pin which is coupled within a hollow 44 of the insert component 40A, and the second portion 394 of the dampener 390 is a dampener body which at least partially extends from and at least partially retracts within the hollow 44 of the insert component 40A.

The insert component 40A includes a first and second corner hole 48, 49 for receiving therethrough a first and second threaded stem 112, 114 of the front leaf component 22, wherein the front leaf component 22 is configured the same as FIG. 5A. A first and second fastener 801, 802 are received through holes of the rear leaf component 24 and fasten with the first and second stems 112, 114 respectively to secure the insert component 340 between the front and rear leaf components 22, 24.

The front leaf component 22 includes an intermediary knuckle 130 and the mounting assembly 310 includes a mounting component 312, as shown in FIG. 18B, including a first knuckle 332 and a second knuckle 334. The intermediary knuckle 130, the first knuckle 332 and the second knuckle 334 are coaxial to form a barrel 140. The barrel 140 further includes a first cap 150 including a first cap neck 152 which extends through the first knuckle 332 and protrudes within the intermediate knuckle 130. The barrel 140 further includes a second cap 160 including a second cap neck 162 which extends through the second knuckle 334 and protrudes within the intermediate knuckle 130. Bush components 170, 180 can engage with first and second openings of the intermediary knuckle 130 to thereby allow rotational movement between the knuckles 130, 332, 334.

The hinge 300 further includes a torsion spring 190 having a first end 192 coupled to one of the first and second caps 150, 160. A second end 194 of the torsion spring 190 is coupled to the intermediary knuckle 130 as discussed in previous examples. Hinged movement of the hinge 300 away from the retained position causes potential energy to increase in the torsion spring 190 to thereby contribute toward biasing the hinge toward the retained position.

The hinge 300 further includes a spring loaded component 220 mounted to the insert component 40A. The spring loaded component 220 includes a ball 222 which rolls along an inner surface of the first or second cap neck 150, 160 during hinged movement. As previously discussed, the inner surface includes an indentation 164 to partially accommodate the ball 222 when the hinge 300 moves to an open position. The ball 222 is biased by the spring loaded component 220 to remain at least partially within the indentation 164 to releasably hold the hinge 300 in the open position until an external rotational force is applied to dislodge the ball 222 from the indentation 164 such that the hinge 300 is biased toward the retained position.

Figure 19:
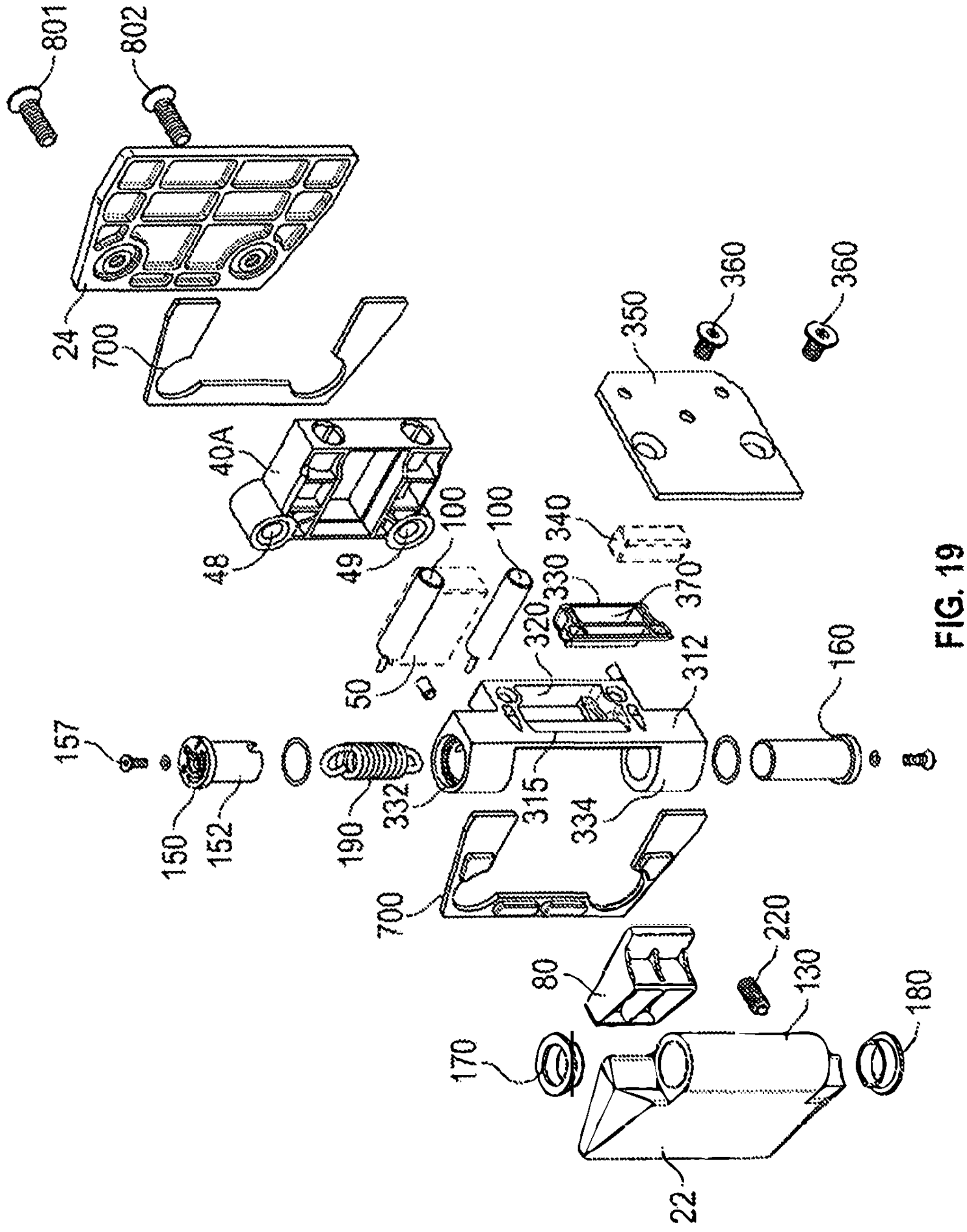
FIG. 19 is an exploded isometric view of the hinge of FIG. 18A.

As shown in FIGS. 19, the mounting component 312 of the mounting assembly 310 includes an intermediary housing portion 315 which extends between the first and second knuckles 332, 334. The intermediary housing portion 315 includes a cavity 320 for receiving therein the second magnetic element 340. The mounting component 310 further includes a mounting insert component 330 including a cavity 370 for housing the second magnetic element 340, wherein the mounting insert component 330 is tight fittingly received within the cavity 320 of the intermediary housing portion 315. A rear external surface of the intermediary housing portion 315 provides the striking surface which strike the ends of the dampeners 100, wherein the striking surface can includes a corresponding number of protrusions to receive the ends of the dampener bodies.

Figure 21:
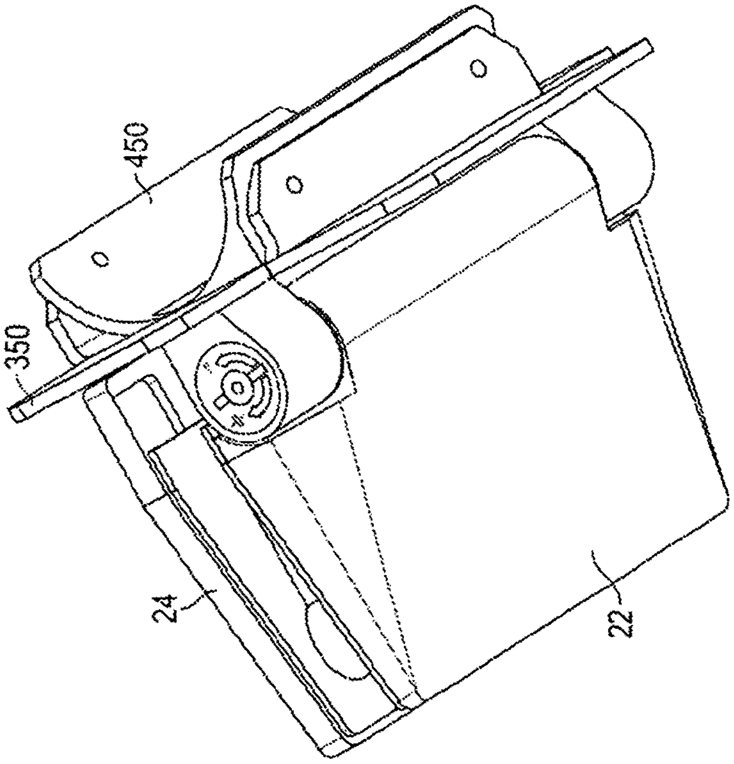
FIG. 21 is an elevated view of a sixth example of a hinge.

As shown in FIGS. 18A and 19, the hinge 300 further includes a mounting surface component 350 which is releasably secured to the intermediary housing portion 315 to enclose the cavity 320 and provide a mounting surface. As shown in FIGS. 18A and 19, the mounting surface of the mounting surface component 350 can be planar for mounting the hinge 300 to a planar surface such as a wall or the like. However, as shown in FIG. 21, a curved mounting surface component 450 can be fastened to the planar mounting surface 350, such that a curved mounting surface is provided for mounting the hinge 300 to a curved object such as a pole or the like. The curved mounting surface component 450 includes a rear planar mounting surface 455 for mounting the curved mounting surface component 450 to the planar surface of the planar mounting component 350. A front portion of the curved mounting component 450 provides a pair of curved fingers 470 defining a cavity 480 defining the curved mounting surface for receiving therein a curved object such as a pole or the like which the hinge 300 can be mounted thereto. The rear planar mounting surface 455 includes one or more holes for allowing a fastener to fasten the curved mounting component 450 to the planar mounting component 350.

Figure 20:
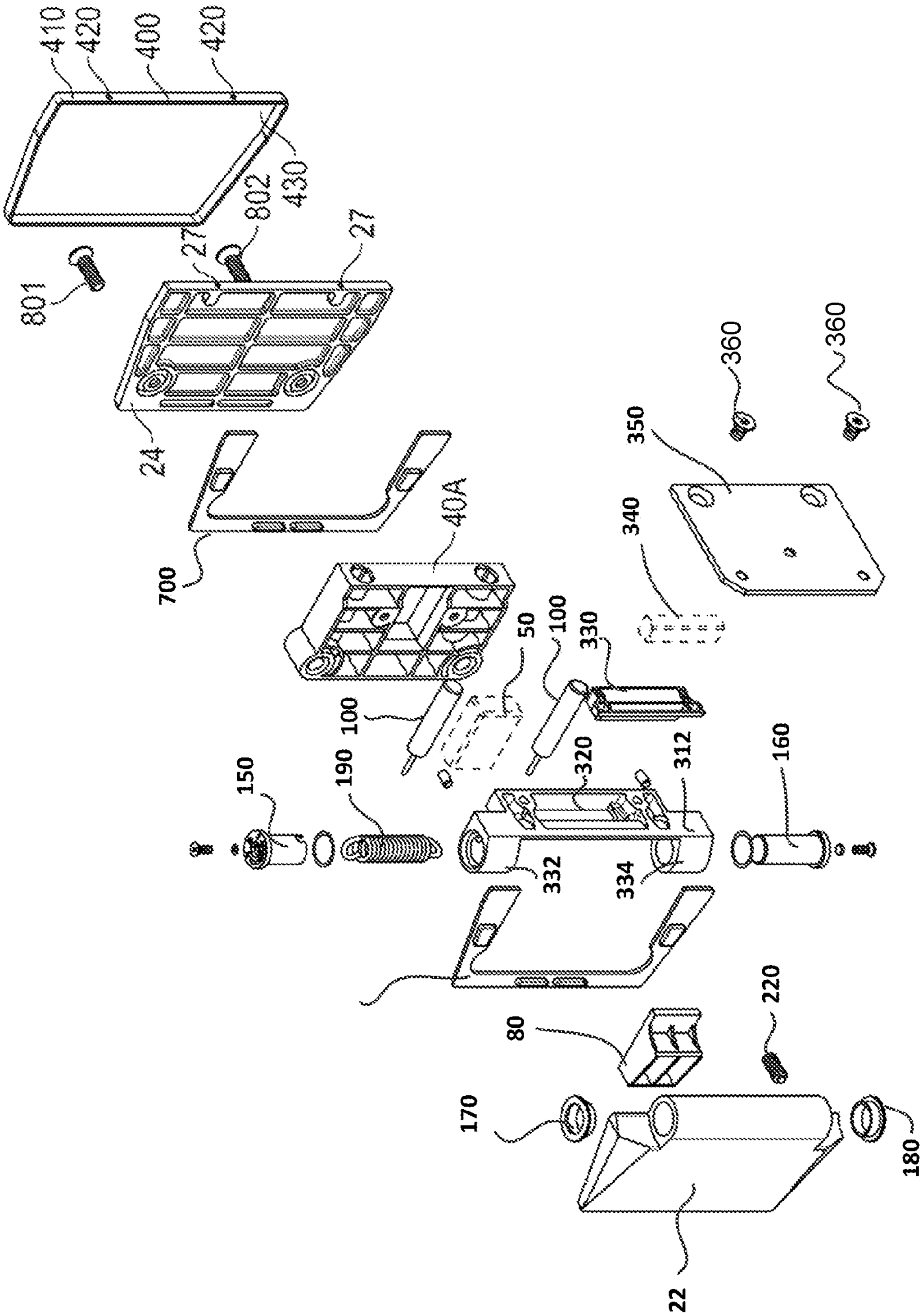
FIG. 20 is an exploded isometric view of a fifth example of a hinge.
Figure 22:
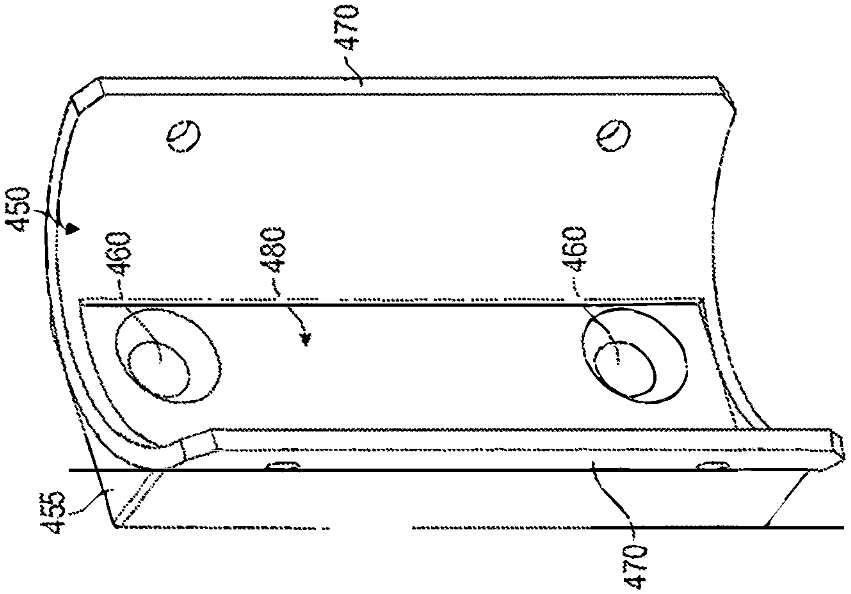
FIG. 22 is a curved mounting surface component of the hinge of FIG. 21.

Referring to FIG. 20 there is shown a further exploded isometric view of a further variation of the hinge 300 of FIG. 19. In particular, the insert component 40 corresponds to that described in relation to the hinge of FIG. 1A. Furthermore, the hinge 300 includes a cover 400 that extends over the rear leaf component 24. The cover 400 includes an circumferential protruding edge 410 defining a shallow cavity 430 to tight fittingly receive the rear leaf component 24. One portion of the edge 410 of the cover 400 include holes 420 which align with holes 27 provided in an edge of the rear leaf component 330 that is mounted adjacent the barrel 140, wherein cover fasteners fasten the aligned holes of the rear leaf component 24 and the cover 400. The cover 400 covers the pair of fasteners 801, 802 which secure the front leaf component 22 to the rear leaf component 24. This is advantageous to prevent unauthorised personnel dismantling the hinge 300 by unscrewing the fasteners 801, 802. For example, in the event that the hinge 300 was coupled to a door for a lockable boardroom, the cover 480 can prevent unauthorised personnel unscrewing the fasteners if the door is locked due to being unable to access the cover fasteners.

As shown in FIG. 21, the longitudinal edge of the rear leaf component 24 which is fastened to the cover 400 is in close proximity to the planar mounting component 350, thereby preventing unauthorised personnel being able to access the cover fasteners 801, 802 whilst the hinge 300 is maintained in the retained position (such as via a lock or the like) as shown in FIG. 21. In the event that the cover 480 needs to be removed, the hinge 300 is moved away from the retained position (e.g. the door is unlocked and the door is opened) such that the longitudinal mounting edge of the rear leaf component 24 adjacent to the mounting component 350 rotates about the hinge axis 290 in order to expose the cover fasteners securing the cover 400. The cover fasteners can then be unscrewed thereby allowing the cover 400 to be removed from the rear surface of the rear leaf component 24.

As shown in the examples, the hinge 10 can include one or more rubber gaskets 700 which include protrusions which engage with cavities defined within the inner surface of the first and second front leaf components 22, 32 and the first and second rear leaf components 24, 34. Similarly, the hinge 300 can include one or more rubber gaskets 700 which include protrusions to engage with cavities defined within the inner surface of the front leaf component 22 and the rear leaf component 24.

It will be appreciated that the example hinges disclosed can be used for many applications. In particular, the hinges can be used for glass doors and gates. Furthermore, the hinges can be used as glass shower hinges. Additionally, the hinges can be used for traditional hinged doors for dwellings and buildings, such as wooden doors and the like.

Many modifications will be apparent to those skilled in the art without departing from the scope of the present invention.

Throughout this specification and the claims which follow, unless the context requires otherwise, the word “comprise”, and variations such as “comprises” or “comprising”, will be understood to imply the inclusion of a stated integer or step or group of integers or steps but not the exclusion of any other integer or step or group of integers or steps.

The invention claimed is:

1. A hinge including:

a first leaf assembly including a first front leaf component coupled to a first rear leaf component for accommodating therebetween a portion of a first panel, wherein the first leaf assembly further includes a first insert component located between the first front and rear leaf components, wherein a portion of the first insert component is adapted to be located within a first cut-out;

a second leaf assembly hingedly connected to the first leaf assembly about a hinge axis, said second leaf assembly including a second front leaf component coupled to a second rear leaf component for accommodating therebetween a portion of a second panel, wherein the second leaf assembly further includes a second insert component located between the second front and rear leaf components, wherein a portion of the second insert component is adapted to be located within a second cut-out;

a spring operatively coupled to the first and second leaf assemblies to bias the hinge to move from an open position to a closed position; and a dampener assembly including a dampener having a longitudinal dampener axis, said dampener at least partially located between the second front leaf component and the second rear leaf component, wherein the dampener is adapted to dampen movement of the hinge from the open position to the closed position, wherein the dampener assembly, in the closed position, directly contacts the first and second leaf assemblies.

2. The hinge according to claim 1, wherein a hinge leaf assembly formed by the first and second leaf assemblies each include one or more knuckles which are coaxially aligned and together form a barrel housing the spring, wherein the hinge further includes at least one end cap coupled to an upper end of the barrel, said end cap having an upper surface acutely angled relative to the hinge axis to prevent the end cap being used as a stepping surface.

3. The hinge according to claim 2, wherein the one or more knuckles includes an intermediary knuckle extending and a pair of end knuckles which surround opposing ends of the intermediary knuckle to form the barrel.

4. The hinge according to claim 3, wherein the at least one end cap further includes a first end cap including a first cap neck which extends through one of the end knuckles and protrudes within the intermediary knuckle.

5. The hinge according to claim 4, wherein the at least one end cap further includes a second end cap including a second cap neck which extends through the second one of the knuckles and protrudes within the intermediary knuckle.

6. The hinge according to claim 3, further including a first bush component located between an upper end of the intermediary knuckle and a top knuckle of the pair of knuckles, and a second bush component located between a lower end of the intermediary knuckle and a bottom knuckle of the pair of knuckles.

7. The hinge according to claim 1, wherein the dampener includes a pin that extends and retracts within a body.

8. The hinge according to claim 7, wherein the spring is a torsion spring having a first end coupled to one of the first cap and the second cap, wherein a second end of the torsion spring is coupled to the intermediary knuckle, wherein hinged movement of the hinge away from the closed position causes potential energy to increase in the torsion spring to thereby contribute toward biasing the hinge toward the closed position.

9. A hinge including:

a leaf assembly including a front leaf component coupled to a rear leaf component for accommodating therebetween a portion of a panel;

a mounting component for mounting said hinge, said mounting component hingedly connected to the leaf assembly about a hinge axis;

a spring operatively coupled to the leaf assembly and mounting component to bias the hinge to move from an open position to a closed position; and a dampener assembly including a dampener having a longitudinal dampener axis, said dampener at least partially located between the front leaf component and the rear leaf component, wherein the dampener is adapted to dampen movement of the hinge from the open position to the closed position, wherein the dampener assembly, in the closed position, directly contacts the leaf assembly and the mounting component.

10. The hinge according to claim 9, wherein the hinge leaf assembly includes one or more knuckles which are coaxially aligned and together form a barrel housing the spring, wherein the hinge further includes an end cap coupled to an upper end of the barrel, said end cap having an upper surface acutely angled relative to the hinge axis to prevent the end cap being used as a stepping surface.

11. The hinge according to claim 9, wherein the mounting component includes a mounting surface for mounting to a structure, wherein the mounting surface includes one of:

a planar profile for mounting the hinge to a planar surface; and curved profile for mounting the hinge to a curved surface.

12. The hinge according to claim 9, wherein the dampener includes a pin that extends and retracts within a body.

* * * * *